US 010772091B2

United States Patent
Luo et al.

(10) Patent No.: US 10,772,091 B2
(45) Date of Patent: Sep. 8, 2020

(54) RESOURCE COORDINATION WITH ACKNOWLEDGEMENT OF SCHEDULING GRANT

(71) Applicant: QUALCOMM Incorporated, San Diego, CA (US)

(72) Inventors: Jianghong Luo, Skillman, NJ (US); Navid Abedini, Somerset, NJ (US); Bilal Sadiq, Basking Ridge, NJ (US); Junyi Li, Chester, NJ (US); Muhammad Nazmul Islam, Littleton, MA (US); Karl Georg Hampel, Hoboken, NJ (US); Hong Cheng, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/283,658

(22) Filed: Feb. 22, 2019

(65) Prior Publication Data

US 2019/0306846 A1 Oct. 3, 2019

Related U.S. Application Data

(60) Provisional application No. 62/649,480, filed on Mar. 28, 2018.

(51) Int. Cl.
*H04W 72/04* (2009.01)
*H04L 1/18* (2006.01)
*H04W 72/14* (2009.01)

(52) U.S. Cl.
CPC .......... *H04W 72/044* (2013.01); *H04L 1/18* (2013.01); *H04W 72/042* (2013.01); *H04W 72/0413* (2013.01); *H04W 72/14* (2013.01)

(58) Field of Classification Search
CPC .......... H04W 72/0413; H04W 72/042; H04W 72/044; H04W 72/14; H04L 1/18
See application file for complete search history.

(56) References Cited

U.S. PATENT DOCUMENTS

| 2016/0128090 A1* | 5/2016 | Azarian Yazdi ...... H04L 5/0048 370/329 |
| 2018/0048498 A1* | 2/2018 | Stern-Berkowitz ......................... H04W 16/14 |

(Continued)

FOREIGN PATENT DOCUMENTS

| WO | 2011041623 A1 | 4/2011 |
| WO | 2016073080 A1 | 5/2016 |

OTHER PUBLICATIONS

International Search Report and Written Opinion—PCT/US2019/019430—ISA/EPO—dated Apr. 26, 2019.

*Primary Examiner* — Paul H Masur
(74) *Attorney, Agent, or Firm* — Loza & Loza LLP

(57) ABSTRACT

Aspects of the disclosure relate to devices for coordinating resource usage. A scheduled device receives a downlink control information (DCI) grant from a scheduling device, the DCI grant identifying scheduled resources for communicating data. The scheduled device decides whether the DCI grant is acceptable for communicating the data and sends an acknowledgement to the scheduling device based on the decision and information associated with the DCI grant. The scheduled device communicates the data via the scheduled resources when the DCI grant is decided to be acceptable. A scheduling device transmits the DCI grant to the scheduled device and receives the acknowledgement from the scheduled device based on the information associated with the DCI grant. The acknowledgement indicates whether the DCI grant is acceptable for communicating the data. The scheduling device communicates the data via (Continued)

Example 1: Explicit acknowledgement request bit = 0

Example 2: Explicit acknowledgement request bit = 1 and DCI is ACKed scheduled resources identified in the DCI grant when the DCI grant is indicated to be acceptable.

26 Claims, 18 Drawing Sheets

(56) References Cited

U.S. PATENT DOCUMENTS

| | | | |
|---|---|---|---|
| 2018/0199335 A1* | 7/2018 | Jung | H04L 5/0055 |
| 2018/0368172 A1* | 12/2018 | Li | H04L 1/1812 |
| 2019/0174540 A1* | 6/2019 | Yoshimura | H04L 27/0006 |

* cited by examiner

RESOURCE COORDINATION WITH ACKNOWLEDGEMENT OF SCHEDULING GRANT

PRIORITY CLAIM

This application claims priority to and the benefit of U.S. Provisional Patent Application No. 62/649,480 filed on Mar. 28, 2018, the entire content of which is incorporated herein by reference as if fully set forth below in its entirety and for all applicable purposes.

TECHNICAL FIELD

The technology discussed below relates generally to wireless communication systems, and more particularly, to backhaul and access link traffic scheduling in wireless communication networks. Embodiments can provide and enable techniques for coordinating resource usage in integrated access and backhaul systems for efficient spectrum utilization, improved network throughput, and continued enhanced user experience.

INTRODUCTION

Multiple access technologies have been adopted in various telecommunication standards to enable different wireless devices to communicate on a peer-to-peer, municipal, national, regional, and even global level. A wireless communication network may include one or more scheduling entities each communicating with one or more scheduled entities. A communication connection or link between two non-UE entities (e.g., between two scheduling entities/base stations or between a scheduling entity/base station and a non-UE entity that is not a scheduling entity) may be referred to as a backhaul link (or backhaul), and a communication connection or link between a scheduling entity and a scheduled entity (e.g., UE) may be referred to as an access link. In some wireless communication networks, the backhaul link and the access link utilize different transmission resources such that interference may be avoided or reduced. Such a wireless communication network may be called a non-integrated access and backhaul system because the access link and the backhaul link are assigned or allocated different transmission resources.

As the demand for mobile broadband access continues to increase, research and development continue to advance wireless communication technologies not only to meet the growing demand for mobile broadband access, but to advance and enhance the user experience with mobile communications. Accordingly, an integrated access and backhaul (IAB) system may be provided. In an IAB system, an access link between a scheduling entity and a scheduled entity, and a backhaul link between non-UE entities (e.g., between scheduling entities/base stations or between a scheduling entity/base station and a non-UE entity that is not a scheduling entity), may utilize the same transmission resource for uplink and/or downlink communication.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method operable at a scheduled device for coordinating resource usage is disclosed. The method includes receiving a downlink control information (DCI) grant from a scheduling device, the DCI grant identifying scheduled resources for communicating data, deciding whether to utilize the scheduled resources identified in the DCI grant for communicating the data, sending an acknowledgement of the DCI grant to the scheduling device based on the decision and based on information associated with the DCI grant, and communicating the data via the scheduled resources when the scheduled resources identified in the DCI grant are decided to be utilized.

In another example, a scheduled device for coordinating resource usage is disclosed. The scheduled device includes means for receiving a downlink control information (DCI) grant from a scheduling device, the DCI grant identifying scheduled resources for communicating data, means for deciding whether to utilize the scheduled resources identified in the DCI grant for communicating the data, means for sending an acknowledgement of the DCI grant to the scheduling device based on the decision and based on information associated with the DCI grant, and means for communicating the data via the scheduled resources when the scheduled resources identified in the DCI grant are decided to be utilized.

In a further example, a scheduled device for coordinating resource usage is disclosed. The scheduled device includes at least one processor, a transceiver communicatively coupled to the at least one processor, and a memory communicatively coupled to the at least one processor. The at least one processor is configured to receive a downlink control information (DCI) grant from a scheduling device, the DCI grant identifying scheduled resources for communicating data, decide whether to utilize the scheduled resources identified in the DCI grant for communicating the data, send an acknowledgement of the DCI grant to the scheduling device based on the decision and based on information associated with the DCI grant, and communicate the data via the scheduled resources when the scheduled resources identified in the DCI grant are decided to be utilized.

In another example, a computer-readable medium storing computer-executable code for coordinating resource usage at a scheduled device is disclosed. The computer-readable medium includes code for causing a computer to receive a downlink control information (DCI) grant from a scheduling device, the DCI grant identifying scheduled resources for communicating data, decide whether to utilize the scheduled resources identified in the DCI grant for communicating the data, send an acknowledgement of the DCI grant to the scheduling device based on the decision and based on information associated with the DCI grant, and communicate the data via the scheduled resources when the scheduled resources identified in the DCI grant are decided to be utilized.

In a further example, a method operable at a scheduling device for coordinating resource usage is disclosed. The method includes transmitting a downlink control information (DCI) grant to a scheduled device, the DCI grant identifying scheduled resources for communicating data, receiving an acknowledgement of the DCI grant from the scheduled device based on information associated with the DCI grant, the acknowledgement indicating whether the scheduled resources identified in the DCI grant are to be utilized for communicating the data, and communicating the data via the scheduled resources when the scheduled resources identified in the DCI grant are indicated to be utilized.

In another example, a scheduling device for coordinating resource usage is disclosed. The scheduling device includes means for transmitting a downlink control information (DCI) grant to a scheduled device, the DCI grant identifying scheduled resources for communicating data, means for receiving an acknowledgement of the DCI grant from the scheduled device based on information associated with the DCI grant, the acknowledgement indicating whether the scheduled resources identified in the DCI grant are to be utilized for communicating the data, means for transmitting a resource request message to a parent relay node, the resource request message identifying the scheduled resources for communicating the data, and means for communicating the data via the scheduled resources when the scheduled resources identified in the DCI grant/resource request message are indicated to be utilized.

In a further example, a scheduling device for coordinating resource usage is disclosed. The scheduling device includes at least one processor, a transceiver communicatively coupled to the at least one processor, and a memory communicatively coupled to the at least one processor. The at least one processor is configured to transmit a downlink control information (DCI) grant to a scheduled device, the DCI grant identifying scheduled resources for communicating data, receive an acknowledgement of the DCI grant from the scheduled device based on information associated with the DCI grant, the acknowledgement indicating whether the scheduled resources identified in the DCI grant are to be utilized for communicating the data, and communicate the data via the scheduled resources when the scheduled resources identified in the DCI grant are indicated to be utilized.

In another example, a computer-readable medium storing computer-executable code for coordinating resource usage at a scheduling device is disclosed. The computer-readable medium includes code for causing a computer to transmit a downlink control information (DCI) grant to a scheduled device, the DCI grant identifying scheduled resources for communicating data, receive an acknowledgement of the DCI grant from the scheduled device based on information associated with the DCI grant, the acknowledgement indicating whether the scheduled resources identified in the DCI grant are to be utilized for communicating the data, and communicate the data via the scheduled resources when the scheduled resources identified in the DCI grant are indicated to be utilized.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
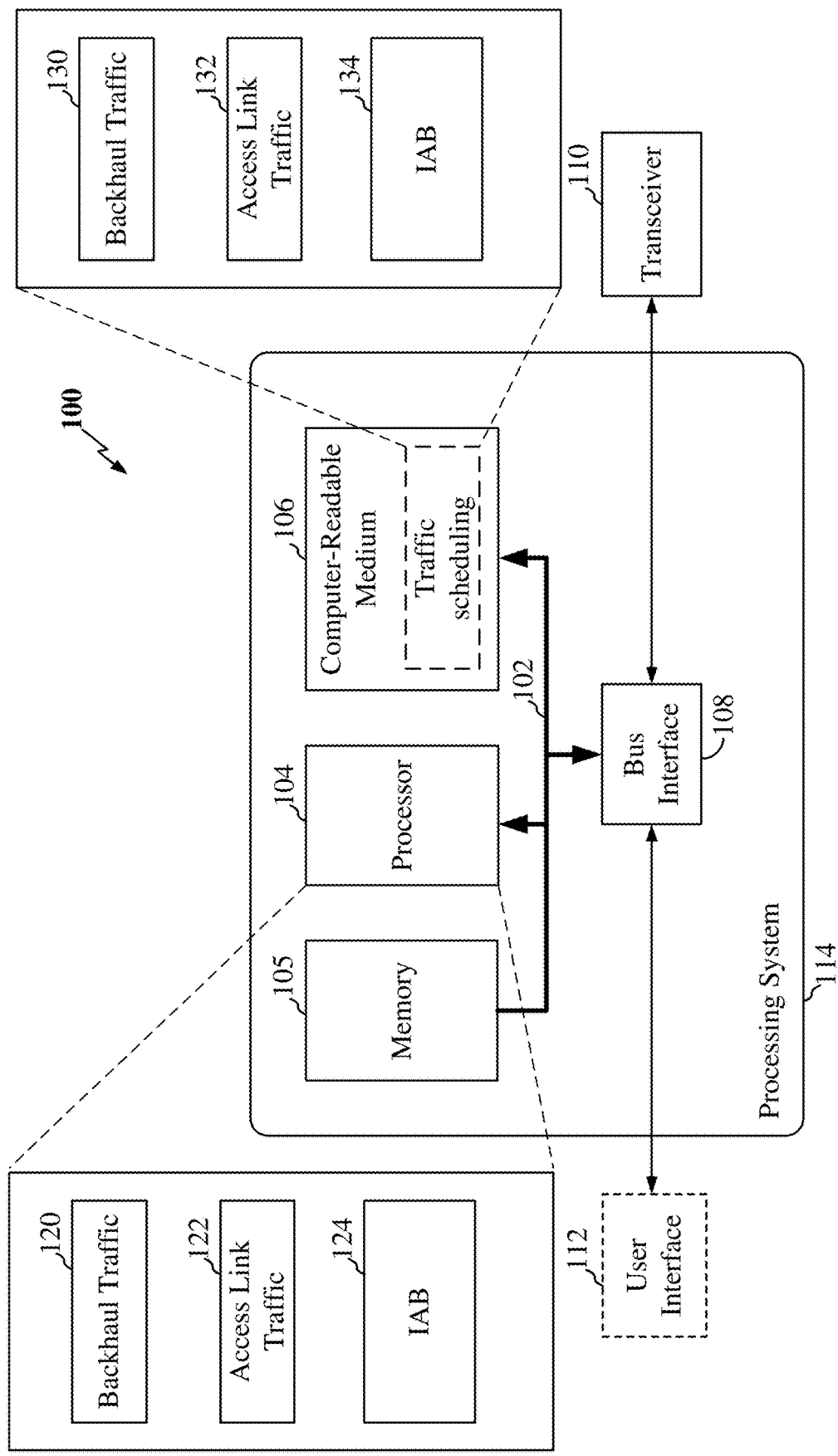
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Resource allocation in an integrated access and backhaul (IAB) network may be subject to a half-duplex constraint. A node subject to the half-duplex constraint cannot transmit and receive at the same time in a same frequency band. Thus, the IAB network is challenged by the half-duplex constraint since a relay node may be both a scheduled node (when performing a UE-function for its parent node) and a scheduling node (when performing an access node-function its child nodes). Accordingly, a resource coordination scheme between relay nodes is needed that avoids conflicting scheduling decisions that violate the half-duplex constraint.

Aspects of the present disclosure relate to a resource allocation scheme for an IAB system that facilitates acknowledgement of a downlink control information (DCI) scheduling grant. For example, the present disclosure provides a method for requesting acknowledgement of the DCI scheduling grant. When a scheduled node receives the DCI scheduling grant with an acknowledgement request from the scheduling node, the scheduled node may evaluate whether the scheduling grant is acceptable or not, and send feedback to the scheduling node accordingly. If the scheduling grant is acceptable, the scheduled node may send a positive acknowledgement (ACK) to the scheduling node, and data traffic between the scheduling node and the scheduled node may occur according to the DCI scheduling grant. Otherwise, if the scheduling grant is not acceptable (e.g., due to conflict with one or more other DCI scheduling grants), the scheduled node may send a negative acknowledgement (NACK) to the scheduling node. As such, the DCI scheduling grant may be abandoned, and no data traffic would occur between the scheduling node and the scheduled node.

The various concepts presented throughout this disclosure may be implemented across a broad variety of telecommunication systems, network architectures, and communication standards.

FIG. 1 is a diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a scheduled entity (e.g., user equipment (UE)) as illustrated in any one or more of FIGS. 2, 3, 6, and/or 8-15. In another example, the apparatus 100 may be a scheduling entity (e.g., a macro base station or a pico base station) as illustrated in any one or more of FIGS. 2, 3, 6, 8-14, and/or 17. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes and procedures described below and illustrated in FIGS. 10-14, 16, and/or 18.

One or more processors 104 in the processing system 114 may execute software (executable software or code). Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106.

The computer-readable medium 106 may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. In some examples, the transceiver 110 may include one or more transmitters and/or receivers, and other known circuits in the art. Depending upon the nature of the apparatus, a user interface 112 (e.g., keypad, display, speaker, microphone, joystick, touchscreen, touchpad, gesture sensor) may also be provided.

The processor 104 may be configured to implement or perform various functions, procedures, and processes. In one aspect of the disclosure, the processor 104 may include a backhaul traffic block 120, an access link traffic block 122, and an integrated access and backhaul (IAB) block 124. The processor 104 may execute a traffic scheduling code stored at the computer-readable medium 106 to configure the backhaul traffic block 120, access link traffic block 122, and IAB block 124, to perform the access link/backhaul traffic scheduling operations described in relation to FIGS. 10-14, 16, and/or 18. For example, the backhaul traffic block 120 may be configured by a backhaul traffic code 130 to determine the data traffic direction (e.g., downlink and/or uplink) between two scheduling entities (e.g., a macro base station and a pico base station). The access link traffic block 122 may be configured by an access link traffic code 132 to determine the data traffic direction (e.g., downlink and/or uplink) between a scheduling entity and a scheduled entity (e.g., a pico base station and a UE). The IAB block 124 may be configured by an IAB code 134 to utilize a transceiver 110 to transmit and/or receive access link data traffic at a scheduling entity (e.g., a pico base station) in a direction determined by the access link traffic block 122 utilizing the same transmission resource (e.g., time and frequency resources) of the backhaul traffic.

The processor 104 is also responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

In some aspects of the present disclosure, an IAB system may be implemented with a network including features of a wireless communication system 200.

Figure 2:
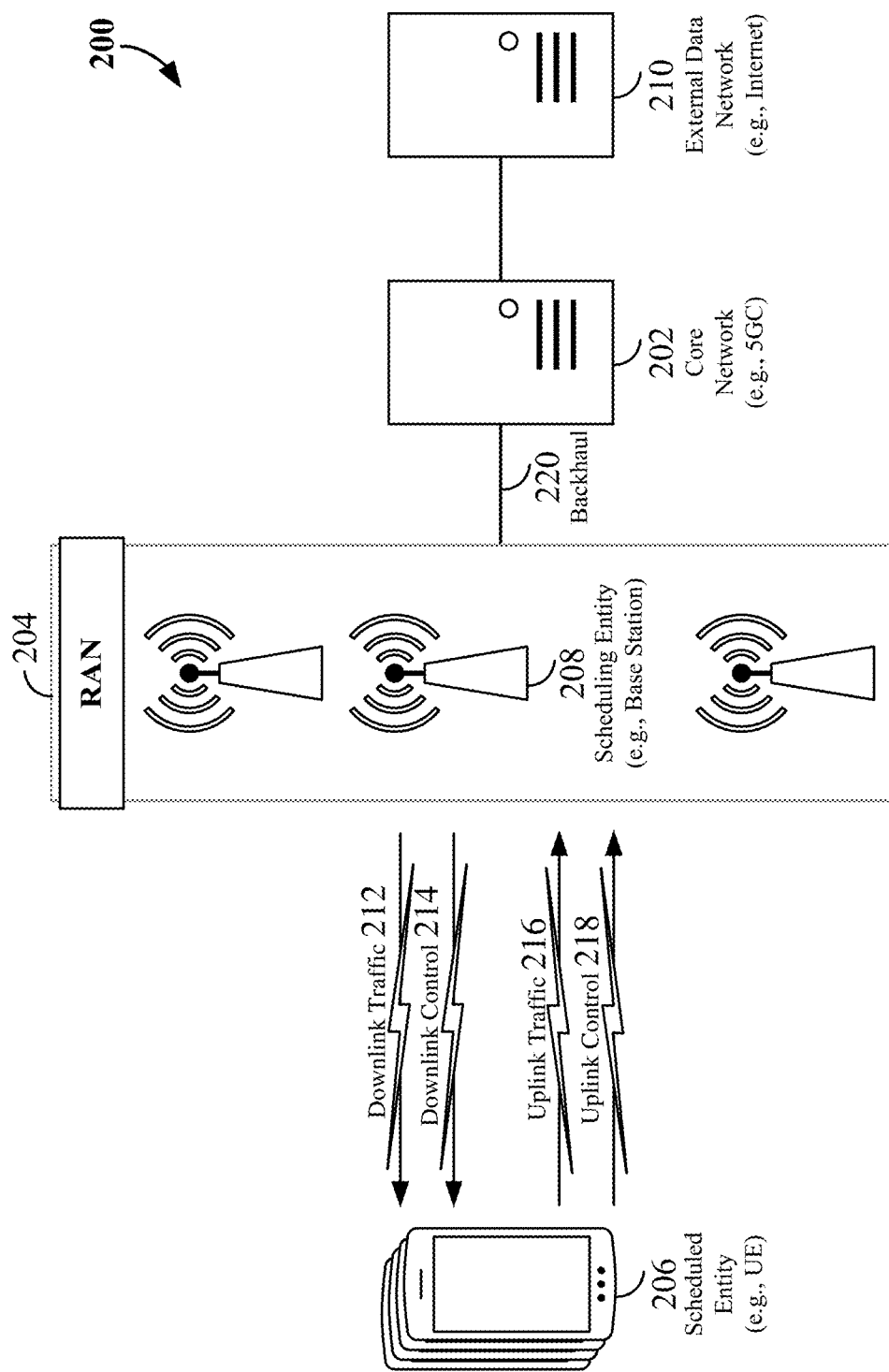
FIG. 2 is a schematic illustration of a wireless communication system.

Referring now to FIG. 2, as an illustrative example without limitation, various aspects of the present disclosure are illustrated with reference to a wireless communication system 200. The wireless communication system 200 includes three interacting domains: a core network 202, a radio access network (RAN) 204, and a user equipment (UE) 206. By virtue of the wireless communication system 200, the UE 206 may be enabled to carry out data communication with an external data network 210, such as (but not limited to) the Internet.

The RAN 204 may implement any suitable wireless communication technology or technologies to provide radio access to the UE 206. As one example, the RAN 204 may operate according to 3$^{rd}$ Generation Partnership Project (3GPP) New Radio (NR) specifications, often referred to as 5G. As another example, the RAN 204 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 204 includes a plurality of base stations 208. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 204 and a UE 206 may be described as utilizing an air interface. Transmissions over the air interface from a base station (e.g., base station 208) to one or more UEs (e.g., UE 206) may be referred to as downlink (DL) transmission. In accordance with certain aspects of the present disclosure, the term downlink may refer to a point-to-multipoint transmission originating at a scheduling entity (described further below; e.g., base station 208). Another way to describe this scheme may be to use the term broadcast channel multiplexing. Transmissions from a UE (e.g., UE 206) to a base station (e.g., base station 208) may be referred to as uplink (UL) transmissions. In accordance with further aspects of the present disclosure, the term uplink may refer to a point-to-point transmission originating at a scheduled entity (described further below; e.g., UE 206).

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 206, which may be scheduled entities, may utilize resources allocated by the scheduling entity 208.

Base stations 208 are not the only entities that may function as scheduling entities. That is, in some examples, a UE may function as a scheduling entity, scheduling resources for one or more scheduled entities (e.g., one or more other UEs).

As illustrated in FIG. 2, a scheduling entity 208 may broadcast downlink traffic 212 to one or more scheduled entities 206. Broadly, the scheduling entity 208 is a node or device responsible for scheduling traffic in a wireless communication network, including the downlink traffic 212 and, in some examples, uplink traffic 216 from one or more scheduled entities 206 to the scheduling entity 208. On the other hand, the scheduled entity 206 is a node or device that receives downlink control information 214, including but not limited to scheduling information (e.g., a grant), synchronization or timing information, or other control information from another entity in the wireless communication network such as the scheduling entity 208.

In general, base stations 208 may include a backhaul interface for communication with a backhaul portion 220 of the wireless communication system. The backhaul 220 may provide a link between a base station 208 and the core network 202. Further, in some examples, a backhaul network may provide interconnection between the respective base stations 208. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

Figure 3:
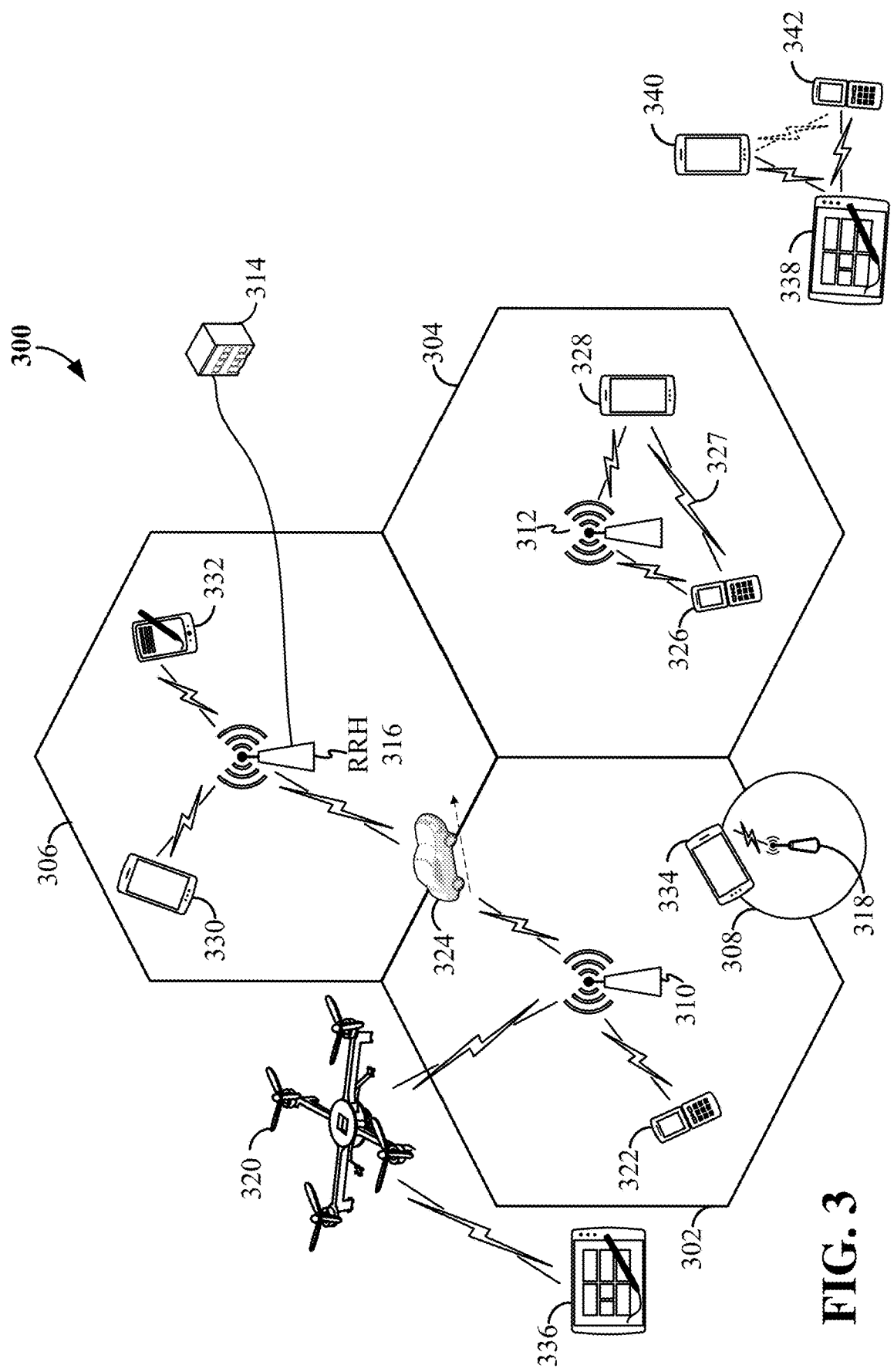
FIG. 3 is a conceptual illustration of an example of a radio access network.

Referring now to FIG. 3, by way of example and without limitation, a schematic illustration of a RAN 300 is provided. In some examples, the RAN 300 may be the same as the RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 306 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 208 described above and illustrated in FIG. 2.

FIG. 3 further includes a quadcopter or drone 320, which may be configured to function as a base station. That is, in some examples, a cell may not necessarily be stationary, and the geographic area of the cell may move according to the location of a mobile base station such as the quadcopter 320.

Within the RAN 300, the cells may include UEs that may be in communication with one or more sectors of each cell. Further, each base station 310, 312, 314, 318, and 320 may be configured to provide an access point to a core network 202 (see FIG. 2) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as the UE/scheduled entity 206 described above and illustrated in FIG. 2.

In some examples, a mobile network node (e.g., quadcopter 320) may be configured to function as a UE. For example, the quadcopter 320 may operate within cell 302 by communicating with base station 310.

In a further aspect of the RAN 300, sidelink signals may be used between UEs without necessarily relying on scheduling or control information from a base station. For example, two or more UEs (e.g., UEs 326 and 328) may communicate with each other using peer to peer (P2P) or sidelink signals 327 without relaying that communication through a base station (e.g., base station 312). In a further example, UE 338 is illustrated communicating with UEs 340 and 342. Here, the UE 338 may function as a scheduling entity or a primary sidelink device, and UEs 340 and 342 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 340 and 342 may optionally communicate directly with one another in addition to communicating with the scheduling entity 338. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 300, the ability for a UE to communicate while moving, independent of its location, is referred to as mobility. The various physical channels between the UE and the radio access network are generally set up, maintained, and released under the control of an access and mobility management function (AMF, not illustrated, part of the core network 202 in FIG. 2), which may include a security context management function (SCMF) that manages the security context for both the control plane and the user plane functionality, and a security anchor function (SEAF) that performs authentication.

In various aspects of the disclosure, a radio access network 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/316 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/316) within the radio access network 300. Each of the cells may measure a strength of the pilot signal, and the radio access network (e.g., one or more of the base stations 310 and 314/316 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/316 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 300 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 4:
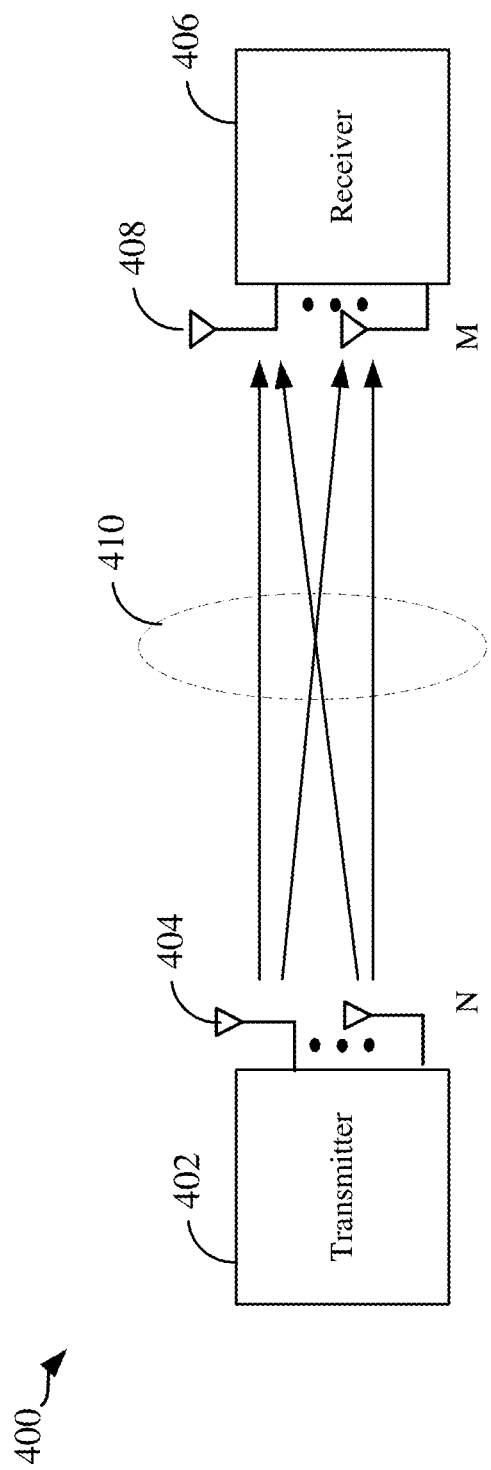
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 208, a scheduled entity 206, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 208 and scheduled entities 206 may include suitable hardware and capabilities (e.g., an encoder, a decoder, and/or a CODEC) to utilize one or more of these channel codes for wireless communication.

The air interface in the radio access network 300 may utilize one or more multiplexing and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 5. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 5, an expanded view of an exemplary DL subframe 502 is illustrated, showing an OFDM resource grid 504. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 504 may be used to schematically represent time-frequency resources for a given antenna port. That is, in a MIMO implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

A UE generally utilizes only a subset of the resource grid 504. An RB may be the smallest unit of resources that can be allocated to a UE. Thus, the more RBs scheduled for a UE, and the higher the modulation scheme chosen for the air interface, the higher the data rate for the UE.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 510 illustrates the slot 510 including a control region 512 and a data region 514. In general, the control region 512 may carry control channels (e.g., PDCCH), and the data region 514 may carry data channels (e.g., PDSCH or PUSCH). Of course, a slot may contain all DL, all UL, or at least one DL portion and at least one UL portion. The simple structure illustrated in FIG. 5 is merely exemplary in nature, and different slot structures may be utilized, and may include one or more of each of the control region(s) and data region(s).

Figure 5:
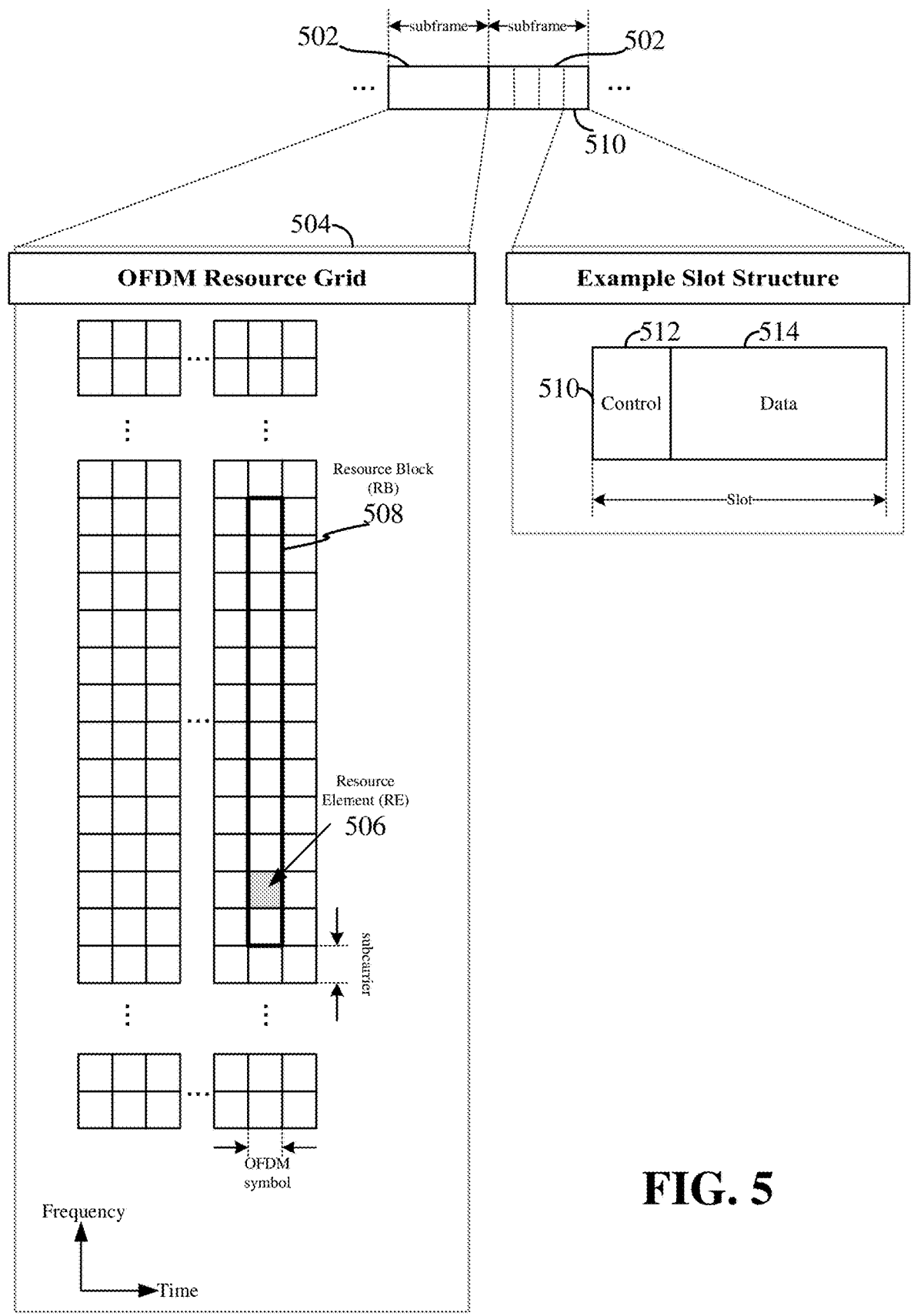
FIG. 5 is a schematic illustration of an organization of wireless resources in an air interface utilizing orthogonal frequency divisional multiplexing (OFDM).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 508.

In a DL transmission, the transmitting device (e.g., the scheduling entity 208) may allocate one or more REs 506 (e.g., within a control region 512) to carry DL control information 214 including one or more DL control channels that generally carry information originating from higher layers, such as a physical broadcast channel (PBCH), a physical downlink control channel (PDCCH), etc., to one or more scheduled entities 206. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 206) may utilize one or more REs 506 to carry UL control information 218 originating from higher layers via one or more UL control channels, such as a physical uplink control channel (PUCCH), a physical random access channel (PRACH), etc., to the scheduling entity 208. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 506 (e.g., within the data region 514) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 2 and 5 are not necessarily all the channels or carriers that may be utilized between a scheduling entity 208 and scheduled entities 206, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 6:
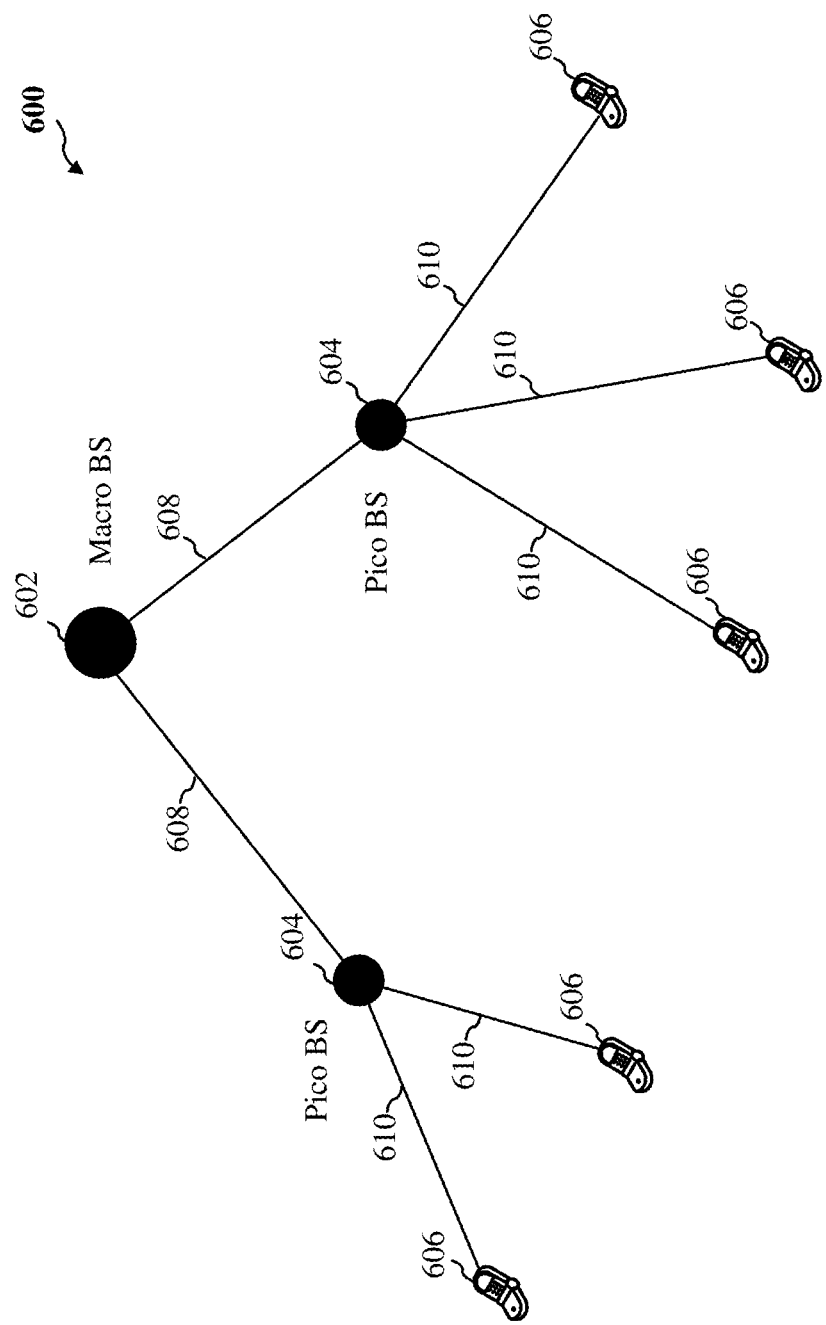
FIG. 6 is a diagram illustrating an example of an integrated access and backhaul (IAB) network in accordance with an aspect of the disclosure.

FIG. 6 is a diagram illustrating an example of an integrated access and backhaul (IAB) network 600 in accordance with an aspect of the disclosure. The wireless IAB network 600 may include any number of scheduling entities (e.g., macro base stations, pico base stations) and UEs. In the IAB network 600, a macro base station 602 may establish backhaul connections 608 with one or more pico base stations 604. Each pico base station 604 may establish access link 610 connections with one or more UEs 606. Each connection may include one or more carriers or channels for facilitating communication between base stations and UEs. The macro base station, pico base station, and UEs illustrated in FIG. 6 may be any of the base stations and UEs illustrated in FIGS. 1-3 discussed above. In some aspects of the disclosure, there may be additional layers of base stations between the macro base station 602 and the pico base station 604. In one example, each layer between the macro base station 602 and pico base station 604 may include a base station configured to relay communication between the macro base station 602 and pico base station 604. In some examples, one or more backhauls and access links may be assigned common transmission resources for access link and/or backhaul communication. Some examples of transmission resources include time slots, frequency spectrum, channels, carriers, spreading codes, scrambling codes.

Figure 7:
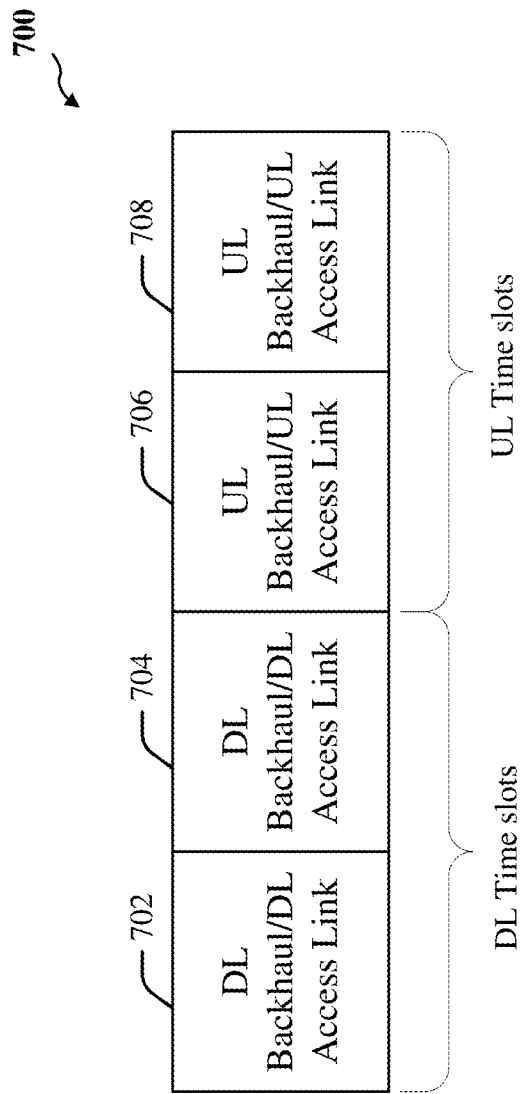
FIG. 7 is a diagram illustrating an example of a time division duplexing (TDD) frame structure in accordance with an aspect of the disclosure.

FIG. 7 is a diagram illustrating an example of a time division duplexing (TDD) frame structure 700 in accordance with an aspect of the disclosure. The TDD frame structure 700 illustrates an example of backhaul subframes and access link subframes sharing a same resource. TDD can be utilized in the IAB network of FIG. 6 or other TDD networks. In the IAB network 600, for example, the backhaul communication between a macro base station 602 and a pico base station 604 may be time-divided into UL subframes and DL subframes utilizing the TDD frame structure 700. Similarly, the access link communication between a pico base station 604 and a UE 606 may be time-divided into UL subframes and DL subframes utilizing the TDD frame structure 700.

In the downlink (DL) time slots, backhaul DL traffic and access link DL traffic may share the same DL time slot or subframe, e.g., DL time slots or subframes 702 and 704. Similarly, in the uplink (UL) time slots, backhaul UL traffic and access link UL traffic may share the same UL time slot or subframe, e.g., UL time slots or subframes 706 and 708. In an aspect, a resource can be dynamically allocated to backhaul and access links by a scheduling node according to its own algorithm.

Figure 8:
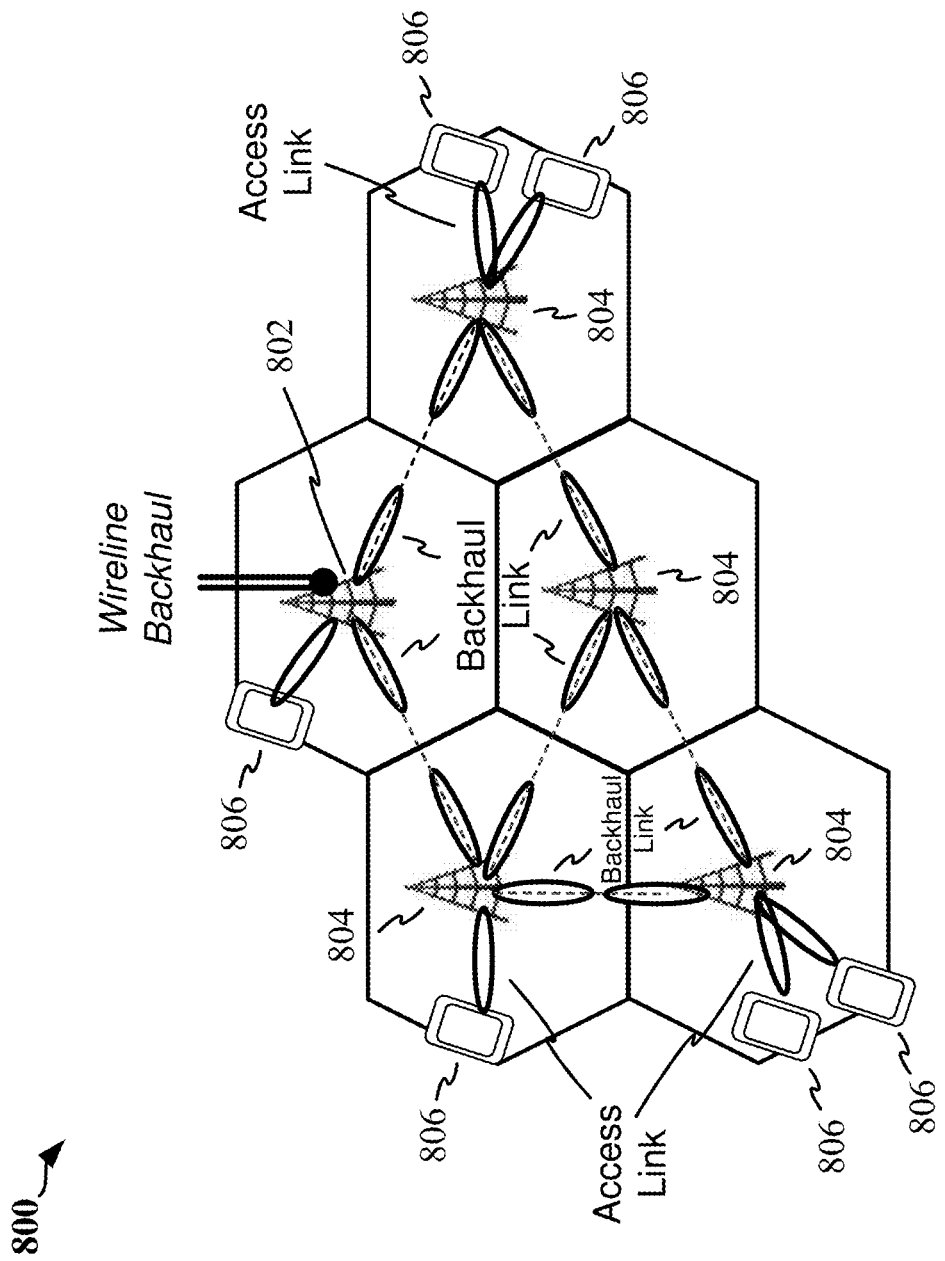
FIG. 8 illustrates an example of an integrated access and backhaul (IAB) system.

FIG. 8 illustrates an example of an integrated access and backhaul (IAB) system 800. 5G NR technologies, such as a mmWave technology, may be used to support the IAB system 800. The IAB system 800 may include one or more anchor nodes 802, one or more access/relay nodes 804, and one or more UEs 806.

In an aspect, an anchor node 802 may be an access node with a wireline connection to a network. A relay node 804 may be an access node that relays traffic to and from the anchor node 802 via a single hop or multiple hops. An access/relay node 804 may be connected to a UE 806 via an access link A network of access links between access/relay nodes 804 and UEs 806 may be referred to as an access network. Access/relay nodes 804 may be connected to each other via a backhaul link A network of backhaul links between access/relay nodes may be referred to as a backhaul network.

In the IAB system 800, an access link (between an access/relay node 804 and a UE 806) and a backhaul link (between access/relay nodes 804) may utilize the same transmission resources for uplink and/or downlink communication.

Figure 9:
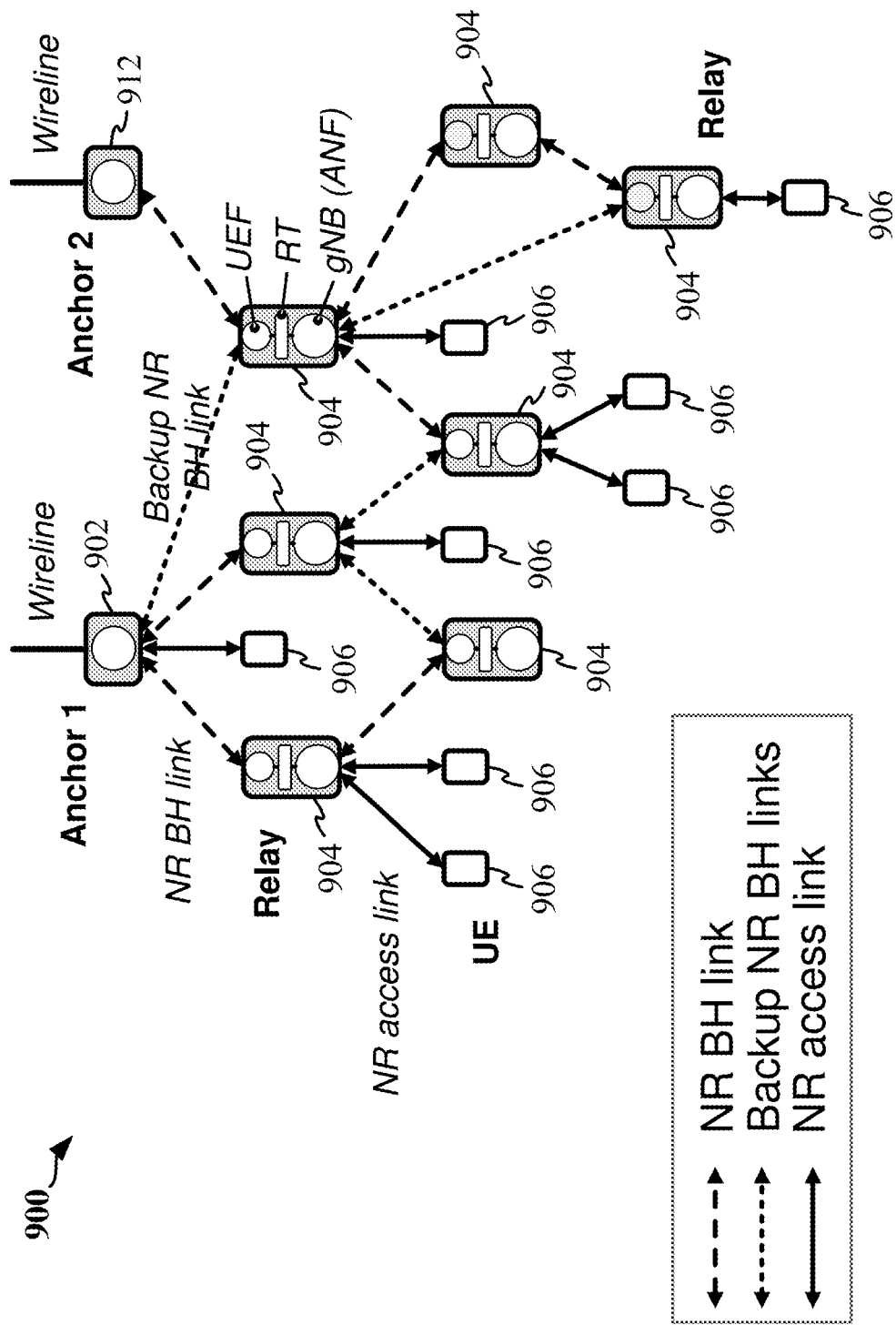
FIG. 9 illustrates an example network topology of an IAB system in accordance with aspects of the present disclosure.

FIG. 9 illustrates an example network topology 900 of an IAB system in accordance with aspects of the present disclosure. As shown, the example network topology 900 may include a first anchor node 902, a second anchor node 912, relay nodes 904, and UEs 906.

In an aspect, network topology management may determine connections between the relay nodes 904 and their routes to and from an anchor node (e.g., first anchor node 902 and/or second anchor node 904). For a given topology, a relay node 904 may perform two roles: 1) a UE-function (UEF); and 2) an access node-function (ANF). When the relay node 904 performs the role of the UEF, the relay node 904 acts as a UE for its parent relay nodes. A parent relay node is a node that connects the relay node 904 one hop closer to an anchor node (e.g., first anchor node 902 and/or second anchor node 912). When the relay node 904 performs the role of the ANF, the relay node 904 acts as a gNB for child relay nodes and UEs 906 in the node 904's coverage. A child relay node is a node that hops through the relay node 904 toward an anchor node. Aspects of the present disclosure relate to approaches for allocating resources in an IAB system for a given network topology.

Resource allocation in an IAB network may be subject to a half-duplex constraint. A node subject to the half-duplex constraint cannot transmit and receive at the same time in a same frequency band. Thus, the IAB network is challenged by the half-duplex constraint since a relay node may be both a scheduled node (when performing the role of the UEF for its parent node) and a scheduling node (when performing the role of the ANF for its child nodes). Resource coordination between relay nodes may be necessary to avoid conflicting scheduling decisions that violate the half-duplex constraint.

Various resource allocation schemes for handling the half-duplex constraint have been provided. For example, in one resource allocation scheme, resource sets that are orthogonal in time (e.g., denoted with different shadings/hatchings or denoted as different types) are assigned to different relay nodes. As such, a relay node may perform the role of the ANF only with respect to an assigned resource set, and the half-duplex constraint is handled by assigning a resource set to a relay node that is different from a resource set assigned to the relay node's parent.

In another example, a resource allocation scheme provides for two resource sets (e.g., each resource set denoted with one of two shadings/hatchings or each resource denoted as one of two types). Accordingly, a relay node (e.g., also marked with one of two shadings/hatchings or also marked as one of two types) may perform the role of an unconstrained ANF with respect to the resource set denoted with the same shading/hatching (denoted as the same type) as the relay node, and perform the role of a constrained ANF with respect to the resource set denoted with a shading/hatching/type that is opposite to the shading/hatching/type of the relay node. In the example, an unconstrained ANF may be a relay node having full control of the resources associated with the same shading/hatching/type as the relay node. A constrained ANF may be a relay node that has to make scheduling decisions for data traffic at the resources associated with a shading/hatching/type that is opposite to the shading/hatching/type of the relay node, subject to decisions from its parent and child relay nodes. In an aspect, a decision from the parent and child relay nodes may have a slot structure in terms of downlink (DL), flexible, and/or uplink (UL).

In an aspect of the present disclosure, a novel resource allocation scheme for an IAB system is provided that facilitates (e.g., allows, enables, or assists) acknowledgement of a downlink control information (DCI) scheduling grant. In LTE and 5G NR networks, acknowledgement of a DCI scheduling grant may not be required. Accordingly, the present disclosure provides a method for requesting acknowledgement of the DCI scheduling grant in an explicit or implicit manner.

When requesting acknowledgement of the DCI scheduling grant in the explicit manner, a request bit (e.g., request bit=1) may be added to the DCI scheduling grant. The existence of the request bit in the DCI scheduling grant indicates a request from the scheduling entity to have a scheduled node (scheduled entity) acknowledge reception of the DCI scheduling grant. Optionally, additional bits may be added to the DCI scheduling grant (when the request bit=1) to request other information, e.g., an identification of resources used by the scheduled node for sending feedback.

When requesting acknowledgement of the DCI scheduling grant in the implicit manner, a set of conditions may be preconfigured for indicating that the acknowledgement is required. By preconfiguring the acknowledgement requirement, an explicit request bit for requesting the acknowledgement would not have to be added to the DCI scheduling grant.

Upon receiving the DCI scheduling grant with the acknowledgement request, the scheduled node may evaluate whether the scheduling grant is acceptable or not, and send feedback to the scheduling node accordingly. If the scheduling grant is acceptable, the scheduled node shall send a positive acknowledgement (ACK) to the scheduling node, and data traffic between the scheduling node and the scheduled node shall occur according to the DCI scheduling grant. Otherwise, if the scheduling grant is not acceptable, or if the scheduling grant is not received correctly, the scheduled node shall send a negative acknowledgement (NACK) to the scheduling node, the DCI scheduling grant shall be abandoned, and no data traffic shall occur between the scheduling node and the scheduled node according to the abandoned DCI scheduling grant. Optionally, if the scheduled node sends the NACK, the scheduled node may also provide additional information to help the scheduling node propose a subsequent scheduling grant.

Figure 10:
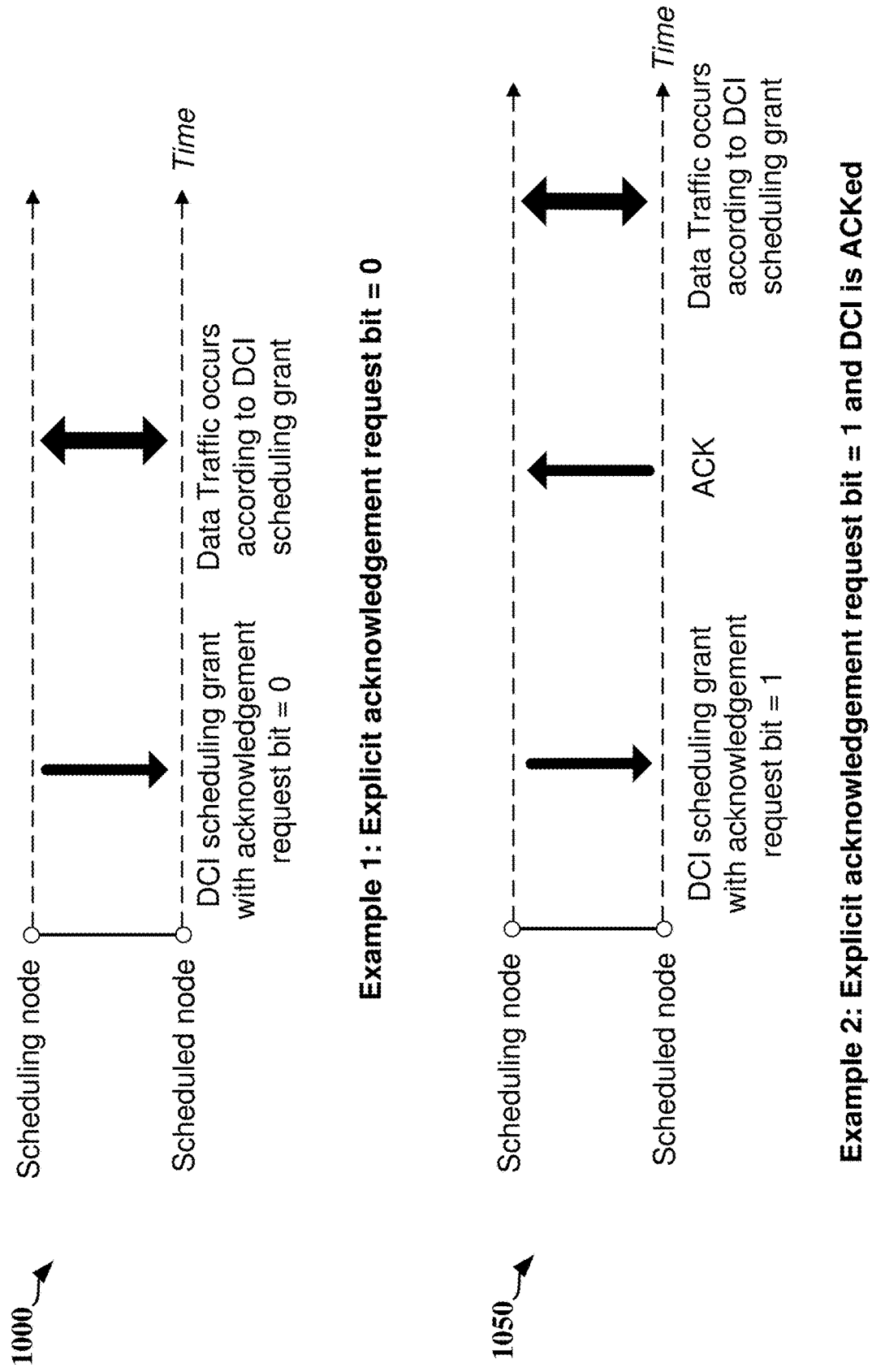
FIG. 10 illustrates example scenarios for requesting acknowledgement of a DCI scheduling grant in an explicit manner according to aspects of the present disclosure.

FIG. 10 illustrates example scenarios for requesting acknowledgement of a DCI scheduling grant in an explicit manner according to aspects of the present disclosure. In a first example scenario 1000, a scheduling node may transmit to a scheduled node a DCI scheduling grant having an acknowledgement request bit set to a certain value (e.g., request bit=0). For example, when the acknowledgement request bit=0, this may indicate to the scheduled node that the sending of an acknowledgement (ACK or NACK) for the DCI scheduling grant is not required. Accordingly, the scheduling node shall expect a data exchange with the scheduled node according to the DCI scheduling grant.

In a second example scenario 1050, the scheduling node may transmit to the scheduled node a DCI scheduling grant having an acknowledgement request bit set to a value of 1. Accordingly, when the acknowledgement request bit=1, this may indicate to the scheduled node that the sending of ACK for the DCI scheduling grant is required. Accordingly, if the DCI scheduling grant is acceptable to the scheduled node, the scheduled node sends the ACK to the scheduling node, and a data exchange between the scheduling node and the scheduled node may occur according to the DCI scheduling grant.

Figure 11:
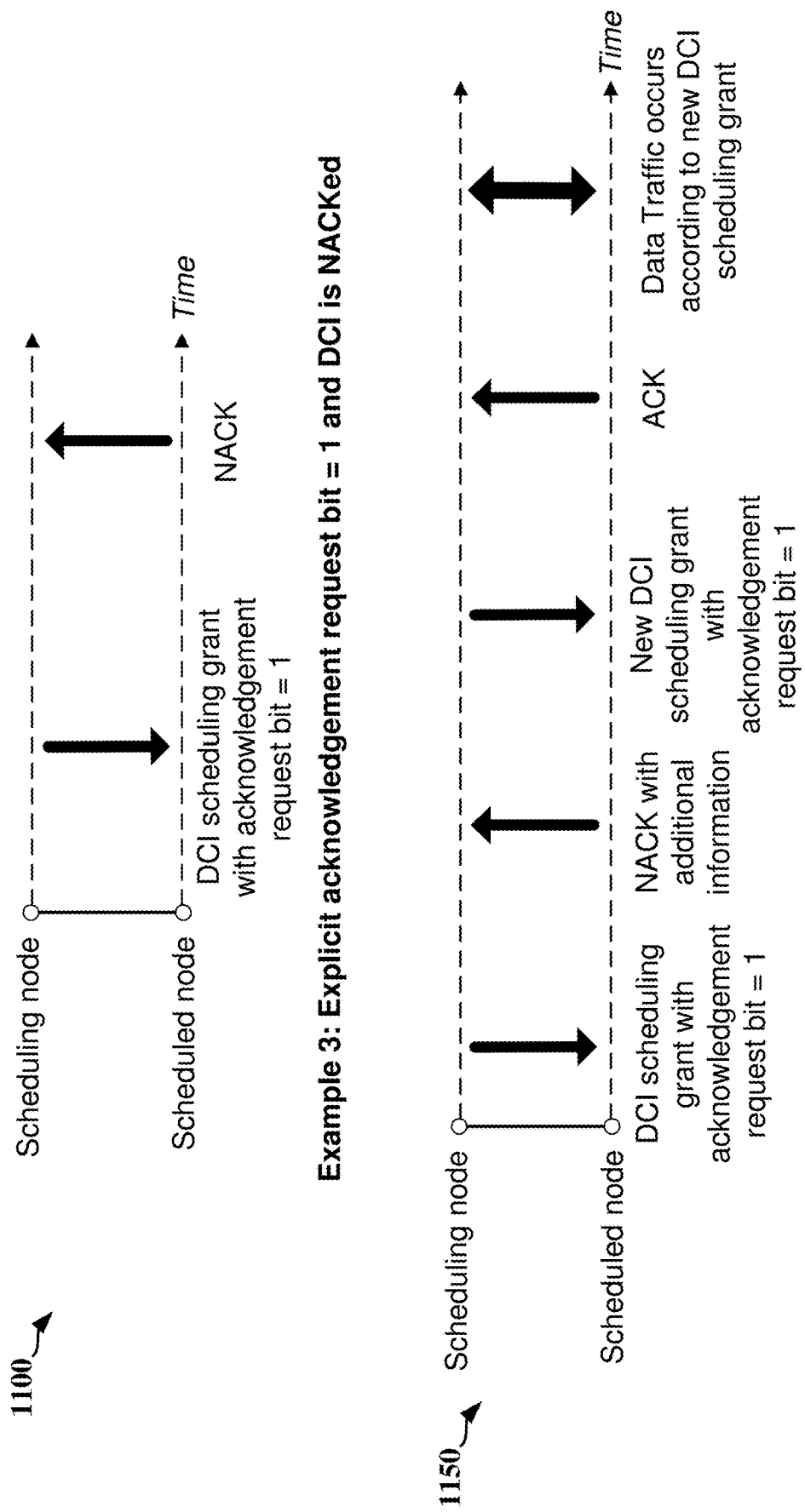
FIG. 11 illustrates other example scenarios for requesting acknowledgement of a DCI scheduling grant in an explicit manner according to aspects of the present disclosure.

FIG. 11 illustrates other example scenarios for requesting acknowledgement of a DCI scheduling grant in an explicit manner according to aspects of the present disclosure. In a third example scenario 1100, the scheduling node may transmit to the scheduled node a DCI scheduling grant having an acknowledgement request bit set to a value of 1. Accordingly, when the acknowledgement request bit=1, this may indicate to the scheduled node that the sending of ACK for the DCI scheduling grant is required. However, the DCI scheduling grant may not be acceptable to the scheduled node. In such a case, the scheduled may send a negative acknowledgement (NACK) to the scheduling node. Accordingly, the scheduling node may abandon the DCI scheduling grant and no data exchange occurs between the scheduling node and the scheduled node according to the abandoned DCI scheduling grant.

In a fourth example scenario 1150, the scheduling node may transmit to the scheduled node a DCI scheduling grant having an acknowledgement request bit set to a value of 1. Accordingly, when the acknowledgement request bit=1, this may indicate to the scheduled node that the sending of ACK or NACK for the DCI scheduling grant is required. If the DCI scheduling grant is not acceptable to the scheduled node, the scheduled node shall send a negative acknowledgement (NACK) to the scheduling node. The scheduled node may send along with the NACK additional information that may be used by the scheduling node upon considering a subsequent DCI scheduling grant. Accordingly, upon receiving the NACK with the additional information, the scheduling node may send to the scheduled node a new DCI scheduling grant having an acknowledgement request bit=1. If the new DCI scheduling grant is acceptable to the scheduled node, the scheduled node sends the ACK to the scheduling node, and a data exchange between the scheduling node and the scheduled node may occur according to the new DCI scheduling grant.

Figure 12:
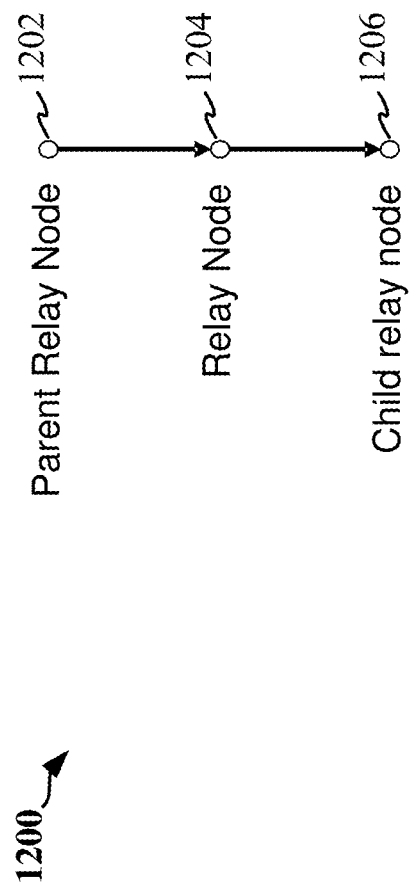
FIG. 12 illustrates example usage scenarios for requesting acknowledgement of a DCI scheduling grant according to aspects of the present disclosure.
Figure 12:
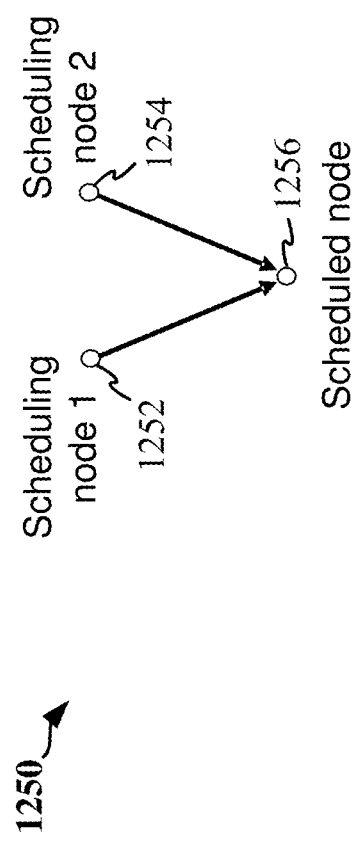

FIG. 12 illustrates example usage scenarios for requesting acknowledgement of a DCI scheduling grant according to aspects of the present disclosure. In an aspect, a process for requesting acknowledgement of the DCI scheduling grant may be used to resolve scheduling conflicts between scheduling nodes and scheduled nodes. In a first example usage scenario 1200, the scheduled node may be a half-duplex relay node 1204 that also performs as a scheduling node for a third node (e.g., child relay node 1206). As such, a DCI scheduling grant received by the relay node 1204 from a parent relay node 1202 may conflict with its own DCI scheduling grant sent to the child relay node 1206. In a second example usage scenario 1250, a scheduled node 1256 may communicate with multiple scheduling nodes (e.g., first scheduling node 1252 and second scheduling node 1254). Accordingly, the scheduled node 1256 may receive multiple DCI scheduling grants (e.g., first DCI scheduling grant from the first scheduling node 1252 and a second DCI scheduling grant from the second scheduling node 1254) that are in conflict with each other.

In an aspect of the disclosure, the acknowledgement for the DCI scheduling grant may be transmitted over an uplink control channel (e.g., physical uplink control channel (PUCCH)) or an uplink data channel (e.g., physical uplink shared channel (PUSCH)). For PUCCH, a scheduled node may reuse an existing PUCCH format for acknowledging downlink (DL) data traffic or define a new PUCCH format for transmitting the DCI scheduling grant ACK or NACK. NACK can be sent via an explicit waveform or implicitly indicated by performing no transmission.

In an aspect of the disclosure, a resource used to transmit the acknowledgement of the DCI scheduling grant may be preconfigured by the scheduling node. Alternatively, the resource used may depend on a resource on which the DCI scheduling grant was decoded. For example, the resource used may be at an uplink (UL) symbol located at a fixed time unit after the DCI scheduling grant. In a further alternative, the resource used may depend on parameters in the DCI scheduling grant. For example, the resource used may be explicitly indicated in the DCI scheduling grant.

As noted above, a scheduled node may provide additional information to a scheduling node when sending the acknowledgement of the DCI scheduling grant to help the scheduling node propose a new DCI scheduling grant. The additional information may be a set of acceptable resources (e.g., time/frequency/space resources) that can be scheduled by the scheduling node. Alternatively, the additional information may be a suggested transmission configuration. For example, the scheduled node may suggest a new modulation and coding scheme (MCS), a transmission (TX) power adjustment, a precoding selection, a back off time, a value, etc. The additional information may be sent together with a NACK, or may be sent over a separate PUSCH transmission whose resource is given by the DCI scheduling grant in case of a NACK transmission.

As also noted above, when requesting acknowledgement of the DCI scheduling grant in the implicit manner, a set of conditions may be preconfigured for indicating that the acknowledgement is required. The preconfigured conditions that determine whether the acknowledgement is required may be based on scheduling content in the DCI scheduling grant. The preconfigured conditions may be configured in a radio resource control (RRC) message or agreed upon in the 3GPP standard.

In one example, a preconfigured condition may relate to resources used for scheduled communication, e.g., an acknowledgement is required for a DCI scheduling grant if a certain type of resources are scheduled in the DCI scheduling grant. In another example, a preconfigured condition may relate to a traffic type, e.g., an acknowledgement is required for a DCI scheduling grant if high priority traffic is scheduled in the DCI scheduling grant. In a further example, a preconfigured condition may relate to a direction of communication, e.g., an acknowledgement is required for a DCI scheduling grant if downlink (DL) traffic is scheduled in the DCI scheduling grant.

In an aspect of the disclosure, upon receiving a DCI scheduling grant with the acknowledgement request, the scheduled node may take any combination of various approaches to decide its feedback to the DCI scheduling grant among multiple conflicting DCI scheduling grants. The multiple conflicting DCI scheduling grants may refer to the received DCI scheduling grants from multiple scheduling nodes, or may refer to a received DCI scheduling grant and its own DCI scheduling grant sent to a child node (when the scheduled node is a relay node).

In an aspect, a decision as to a type of feedback to send for multiple received DCI scheduling grants may be made uniformly at random. Additionally or alternatively, the decision may be based on a priority associated with respective scheduling nodes. For example, the scheduled node may send ACK to a higher priority scheduling node. In another example, a probability of which scheduling node to send ACK to may depend on the priorities of the scheduling nodes. Additionally or alternatively, the decision may be based on a priority parameter provided in the DCI scheduling grant. For example, the scheduled may send ACK based on a quality of service (QoS) associated with some part of data. Additionally or alternatively, the decision may be based on a priority associated with allocated resources in the DCI scheduling grant. For example, in one set of resources, a first scheduling node may be given higher priority, while in another set of resources a second scheduling node may be is given higher priority. Additionally or alternatively, the decision may be based on buffer status information at the scheduled node. For example, a priority associated with each scheduling node may be derived based on buffer information.

In an aspect of the disclosure, when receiving multiple conflicting DCI scheduling grants, some DCI scheduling grants may request acknowledgement while other DCI scheduling grants do not request acknowledgement. Accordingly, the scheduled node may operate differently based on the circumstances.

In one example, if only one DCI scheduling grant of the multiple conflicting DCI scheduling grants does not request acknowledgement, then priority is given to the DCI scheduling grant that does not request the acknowledgement. As such, the scheduled node will exchange data with the scheduling node associated with the DCI scheduling grant that does not request the acknowledgement, and all other scheduling nodes associated with the other DCI scheduling grants will receive a NACK.

In another example, if all of the multiple conflicting DCI scheduling grants request acknowledgement, the scheduled node will select for which DCI scheduling grant to send ACK (e.g., based on the approaches described above). Thereafter, the scheduled node will send ACK to the scheduling node associated with the selected DCI scheduling grant and send NACK to all other scheduling nodes associated with the other DCI scheduling grants.

In a further example, if more than one of the multiple conflicting DCI scheduling grants do not request acknowledgement, the scheduled node may abandon all DCI scheduling grants, or select one DCI scheduling from the DCI scheduling grants that do not request acknowledgement (e.g., based on the approaches described above) and exchange data with the scheduling node associated with the selected DCI scheduling grant. The scheduled node may further send NACK to all scheduling nodes associated with the DCI scheduling grants that request acknowledgement.

In an aspect of the disclosure, the process of requesting acknowledgement of a DCI scheduling grant may be used to resolve scheduling conflicts in an IAB network. According to certain aspects, an operation involving a relay node assigned to a first type of two types of resources opportunistically using resources of a second type of the two types of resources as a constrained ANF may be extended by implementing the acknowledgement request of the DCI scheduling grant. The acknowledgement request process may be implemented between a relay node and its child relay node.

In one aspect, the acknowledgement request process may be applied to a relay node that is an anchor node, which does not have a parent node. In another aspect, the acknowledgement request may be applied where resource coordination between a relay node and its parent node is handled via other operations, and the acknowledgement request process of the present disclosure is applied only to coordinate resources between the relay node and its child relay node. In one example operation for resource coordination between a relay node and its parent node, the relay node may request a configuration of resources of a different type from its parent node and build a direction table to guide its usage of resources of the different type. In another example, the relay node may request resources of a different type from its parent node for the relay node's usage.

In an aspect, when the relay node assigned to a first type of resources schedules the resources of a second type, the relay node may set an acknowledgement request bit to a value of 1 (request bit=1) in a DCI scheduling grant and send the DCI scheduling grant to its child relay node via the first type of resources. The child relay node is assigned to the second type of resources. Accordingly, the child relay node may then evaluate whether the DCI scheduling grant is acceptable to the child relay node. That is, the child relay node determines whether the relay node is allowed to use the second type of resources according to the DCI scheduling grant and feeds back its acknowledgement decision (ACK or NACK) to the relay node. If the acknowledgement indicates ACK, the relay node can use the second type of resources for data traffic according to the DCI scheduling grant. Otherwise, the DCI scheduling grant is abandoned. The child relay node may provide additional information to help the relay node schedule the second type of resources associated with the child relay node. In a further aspect, when the relay node assigned to the first type of resources schedules resources of its own type (first type of resources), the relay node may set the acknowledgement request bit to a value of 0 (request bit=0) in the DCI scheduling grant.

Figure 13:
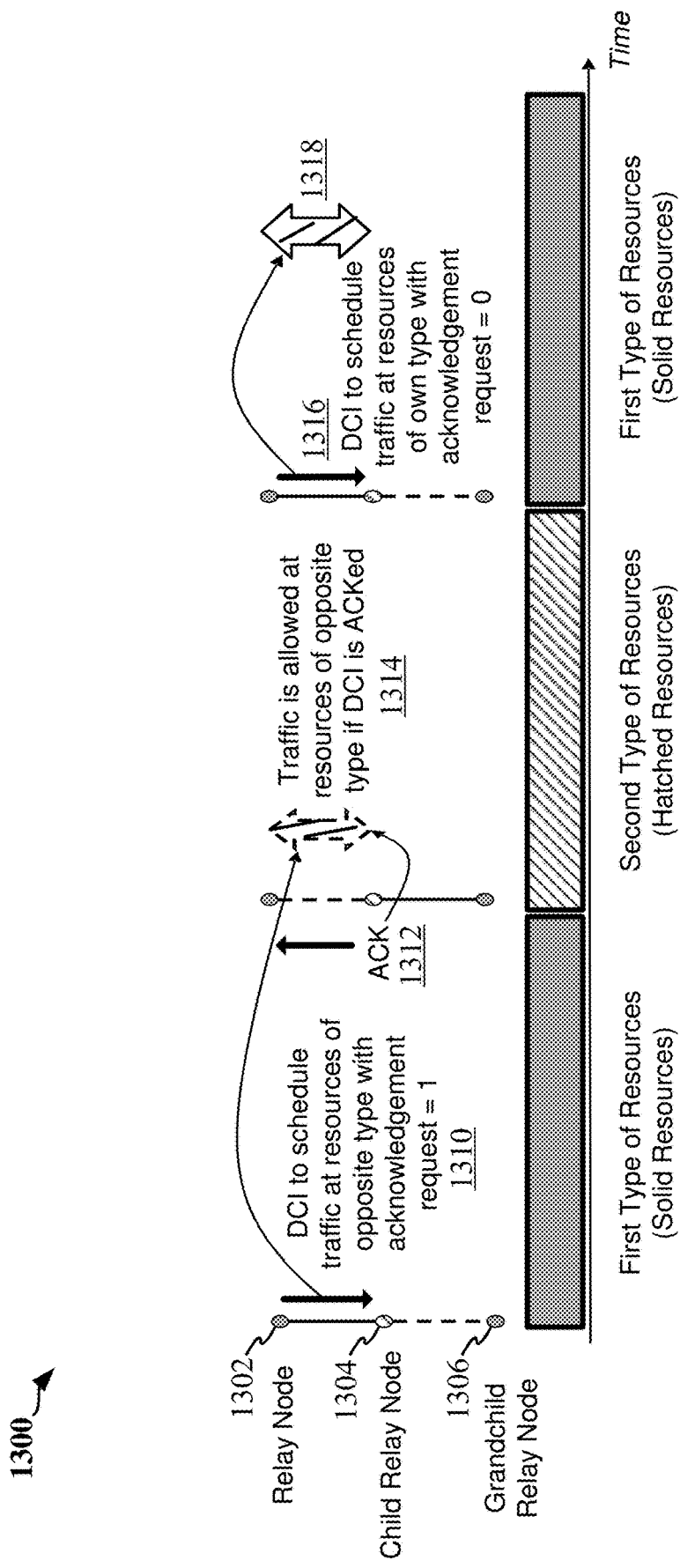
FIG. 13 illustrates an example usage scenario for requesting acknowledgement of a DCI scheduling grant in an IAB network according to aspects of the present disclosure.

FIG. 13 illustrates an example usage scenario 1300 for requesting acknowledgement of a DCI scheduling grant in an IAB network according to aspects of the present disclosure. In the example usage scenario 1300, a scheduled node may be a half-duplex child relay node 1304 with respect to a scheduling relay node 1302. The child relay node 1304 may also perform as a scheduling node for a grandchild relay node 1306. In an aspect, the scheduling relay node 1302 and the grandchild relay node 1306 are assigned to a first type of resources (e.g., solid resources) and the child relay node 1304 is assigned to a second type of resources (e.g., hatched resources).

As shown in FIG. 13, the parent relay node 1302 assigned to the first type of resources may set an acknowledgement request bit to a value of 1 (request bit=1) in a DCI scheduling grant to indicate that data traffic is proposed to be scheduled at the second type of resources (resources of an opposite type). The relay node 1302 then sends the DCI scheduling grant to the child relay node 1304 (1310). The child relay node 1304 assigned to the second type of resources evaluates whether the scheduling relay node 1302 is allowed to use the second type of resources according to the DCI scheduling grant and feeds back its acknowledgement decision (ACK or NACK) to the relay node 1302 (1312). If the decision indicates ACK, the relay node 1302 may use the second type of resources for data traffic according to the DCI scheduling grant (1314).

As further shown in FIG. 13, the relay node 1302 assigned to the first type of resources may set an acknowledgement request bit to a value of 0 (request bit=0) in a subsequent DCI scheduling grant to indicate that data traffic is proposed to be scheduled at resources of its own type (the first type of resources). The relay node 1302 then sends the subsequent DCI scheduling grant to the child relay node 1304 (1316). Because the acknowledgement request bit=0, the child relay node 1304 assigned to the second type of resources knows not to feedback to the relay node 1302 any acknowledgement decision (ACK or NACK) regarding the proposed scheduled use of the first type of resources. Accordingly, the relay node 1302 uses the first type of resources for data traffic according to the subsequent DCI scheduling grant (1318).

In an aspect of the disclosure, if resource coordination between a relay node and its parent is performed via a resource request message, the resource request message may be transmitted at the same time as the DCI scheduling grant if the relay node is capable of transmitting over multiple links at the same time, e.g., when the relay node has multiple antenna panels. The same goes for the acknowledgement to the resource request message. The relay node may receive an ACK to the resource request message at the same time as an ACK to the DCI scheduling grant.

Figure 14:
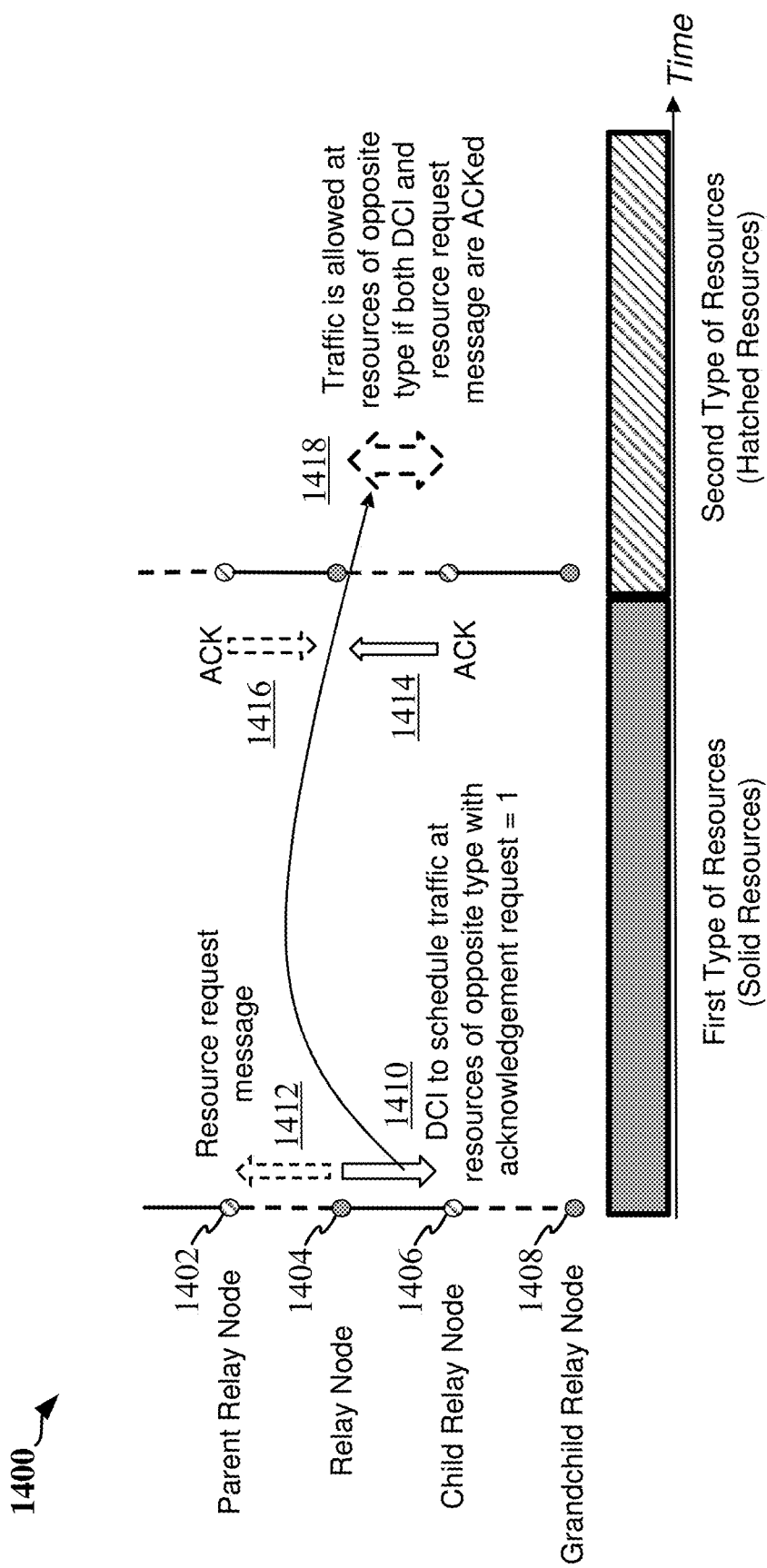
FIG. 14 illustrates another example usage scenario for requesting acknowledgement of a DCI scheduling grant in an IAB network according to aspects of the present disclosure.

FIG. 14 illustrates another example usage scenario 1400 for requesting acknowledgement of a DCI scheduling grant in an IAB network according to aspects of the present disclosure. The example usage scenario 1400 may involve a parent relay node 1402, a relay node 1404, a child relay node 1406, and a grandchild relay node 1408. The relay node 1404 may be a half-duplex scheduled node with respect to the parent relay node 1402 and may also be a half-duplex scheduling node with respect to the child relay node 1408. In an aspect, the relay node 1404 and the grandchild relay node 1408 are assigned to a first type of resources (e.g., solid resources) and the parent relay node 1402 and the child relay node 1406 are assigned to a second type of resources (e.g., hatched resources).

As shown in FIG. 14, the relay node 1404 assigned to the first type of resources may set an acknowledgement request bit to a value of 1 (request bit=1) in a DCI scheduling grant to indicate that data traffic is proposed to be scheduled at the second type of resources (resources of an opposite type). The relay node 1404 then sends the DCI scheduling grant (1410) to the child relay node 1406, which is assigned to the second type of resources. At the same time, the relay node 1404 sends a resource request message (1412) to the parent relay node 1402 (assigned to the second type of resources) to coordinate the proposed use of the second type of resources.

The child relay node 1406 evaluates whether the relay node 1404 is allowed to use the second type of resources according to the DCI scheduling grant and feeds back its acknowledgement decision (ACK or NACK) to the relay node 1404 (1414). At the same time, the parent relay node 1402 evaluates whether the relay node 1404 is allowed to use the second type of resources according to the resource request message and feeds back its acknowledgement decision (ACK or NACK) to the relay node 1404 (1416). If the decision from the child relay node 1406 indicates ACK and the decision from the parent relay node 1402 indicates ACK, the relay node 1404 may use the second type of resources for data traffic (1418).

Figure 15:
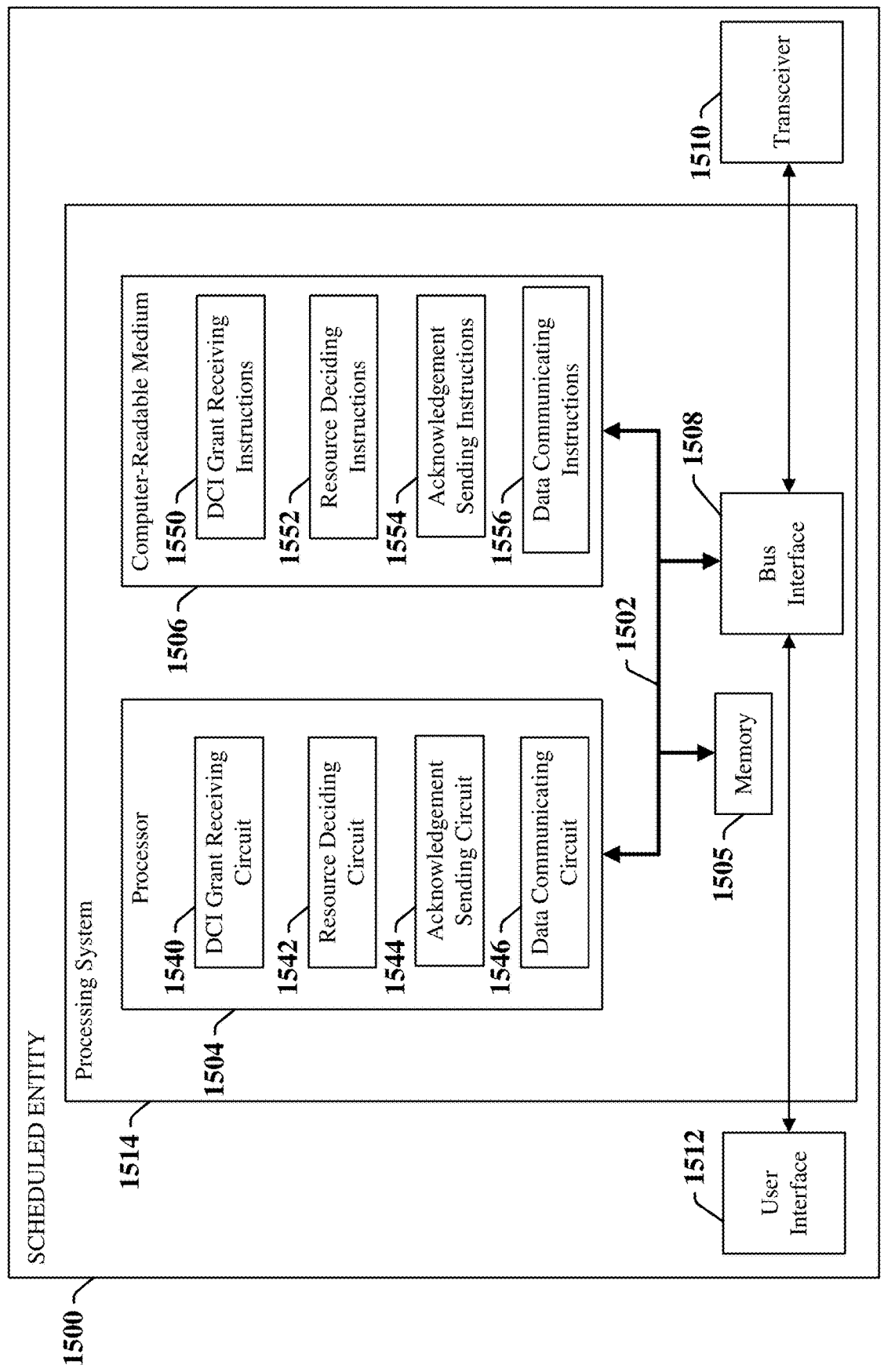
FIG. 15 is a block diagram conceptually illustrating an example of a hardware implementation for a scheduled entity according to some aspects of the disclosure.

FIG. 15 is a conceptual diagram illustrating an example of a hardware implementation for an exemplary scheduled entity 1500 employing a processing system 1514. In accordance with various aspects of the disclosure, an element, or any portion of an element, or any combination of elements may be implemented with a processing system 1514 that includes one or more processors 1504. For example, the scheduled entity 1500 may be a user equipment (UE) as illustrated in any one or more of FIGS. 1-3.

The scheduled entity 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1500 may be configured to perform any one or more of the functions described herein. That is, the processor 1504, as utilized in a scheduled entity 1500, may be used to implement any one or more of the processes and procedures described below and illustrated in FIG. 16.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 may include DCI grant receiving circuitry 1540 configured for various functions, including, for example, receiving a downlink control information (DCI) grant from a scheduling device, the DCI grant identifying scheduled resources for communicating data. For example, the DCI grant receiving circuitry 1540 may be configured to implement one or more of the functions described below in relation to FIG. 16, including, e.g., block 1602. The processor 1504 may also include resource deciding circuitry 1542 configured for various functions, including, for example, deciding whether to utilize the scheduled resources identified in the DCI grant for communicating the data. For example, the resource deciding circuitry 1542 may be configured to implement one or more of the functions described below in relation to FIG. 16, including, e.g., block 1604. The processor 1504 may also include acknowledgement sending circuitry 1544 configured for various functions, including, for example, sending an acknowledgement of the DCI grant to the scheduling device based on the decision and based on information associated with the DCI grant and sending additional information to the scheduling device, wherein the additional information is configured to assist the scheduling device to transmit a subsequent DCI grant scheduling other resources for communicating the data. For example, the acknowledgement sending circuitry 1544 may be configured to implement one or more of the functions described below in relation to FIG. 16, including, e.g., block 1606. The processor 1504 may further include data communicating circuitry 1546 configured for various functions, including, for example, facilitating (e.g., allowing, enabling, or assisting) the data to be communicated via the scheduled resources, or communicating the data via the scheduled resources, when the scheduled resources identified in the DCI grant are decided to be utilized. For example, the data communicating circuitry 1546 may be configured to implement one or more of the functions described below in relation to FIG. 16, including, e.g., block 1608.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1506 may include DCI grant receiving instructions 1550 configured for various functions, including, for example, receiving a downlink control information (DCI) grant from a scheduling device, the DCI grant identifying scheduled resources for communicating data. For example, the DCI grant receiving instructions 1550 may be configured to implement one or more of the functions described below in relation to FIG. 16, including, e.g., block 1602. The computer-readable storage medium 1506 may also include resource deciding instructions 1552 configured for various functions, including, for example, deciding whether to utilize the scheduled resources identified in the DCI grant for communicating the data. For example, the resource deciding instructions 1552 may be configured to implement one or more of the functions described below in relation to FIG. 16, including, e.g., block 1604. The computer-readable storage medium 1506 may also include acknowledgement sending instructions 1554 configured for various functions, including, for example, sending an acknowledgement of the DCI grant to the scheduling device based on the decision and based on information associated with the DCI grant and sending additional information to the scheduling device, wherein the additional information is configured to assist the scheduling device to transmit a subsequent DCI grant scheduling other resources for communicating the data. For example, the acknowledgement sending instructions 1554 may be configured to implement one or more of the functions described below in relation to FIG. 16, including, e.g., block 1606. The computer-readable storage medium 1506 may further include data communicating instructions 1556 configured for various functions, including, for example, facilitating (e.g., allowing, enabling, or assisting) the data to be communicated via the scheduled resources, or communicating the data via the scheduled resources, when the scheduled resources identified in the DCI grant are decided to be utilized. For example, the data communicating instructions 1556 may be configured to implement one or more of the functions described below in relation to FIG. 16, including, e.g., block 1608.

Figure 16:
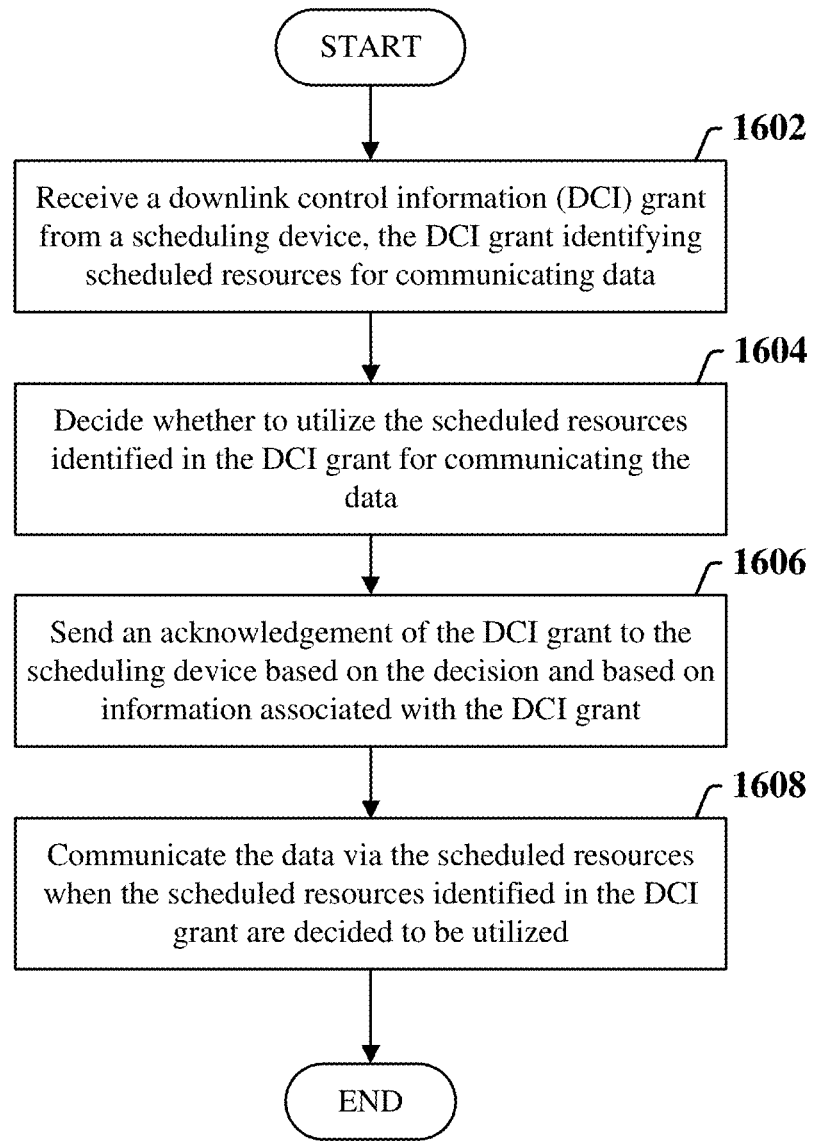
FIG. 16 is a flow chart illustrating an exemplary process for coordinating resource usage at a scheduled entity in accordance with some aspects of the present disclosure.

FIG. 16 is a flow chart illustrating an exemplary process 1600 for coordinating resource usage in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by a scheduled device (e.g., the scheduled entity 1500 illustrated in FIG. 15). In some examples, the process 1600 may be carried out by any suitable apparatus or means for carrying out the functions or algorithm described below.

At block 1602, the scheduled device receives a downlink control information (DCI) grant from a scheduling device. The DCI grant identifies scheduled resources for communicating data.

At block 1604, the scheduled device decides whether to utilize the scheduled resources identified in the DCI grant for communicating the data. In an aspect, the scheduled resources identified in the DCI grant are decided to be utilized based on a random decision, a priority of the scheduling device with respect to at least one other scheduling device from which another DCI grant is received, a priority parameter included in the DCI grant, and/or a priority associated with the scheduled resources identified in the DCI grant. In a further aspect, the priority of the scheduling device is derived based on buffer status information at the scheduled device.

At block 1606, the scheduled device sends an acknowledgement of the DCI grant to the scheduling device based on the decision and based on information associated with the DCI grant. In an aspect, the information associated with the DCI grant is a value of an acknowledgement request bit included in the DCI grant. As such, the scheduled device may read the value of the acknowledgement request bit included in the DCI grant and send the acknowledgement to the scheduling device based on the value of the acknowledgement request bit. In an aspect, if the value of the acknowledgement request bit is 1, a positive acknowledgement (ACK) is sent to the scheduling device to indicate that the scheduled resources identified in the DCI grant are decided to be utilized or a negative acknowledgement (NACK) is sent to the scheduling device to indicate that the scheduled resources identified in the DCI grant are decided to not be utilized. If the value of the acknowledgement request bit is 0, no acknowledgement is sent to the scheduling device. Moreover, if the NACK is sent to the scheduling device, the scheduled device may further send additional information to the scheduling device. The additional information may be configured to assist the scheduling device to transmit a subsequent DCI grant scheduling other resources for communicating the data. The additional information may include an identification of the other resources for communicating the data and/or a transmission configuration (e.g., a modulation and coding scheme (MCS), a transmission (TX) power adjustment, a precoding selection, a back off time, a value, etc.).

In another aspect, the information associated with the DCI grant is a condition associated with the DCI grant. As such, the scheduled device may determine whether the condition associated with the DCI grant is satisfied and send the acknowledgement to the scheduling device if the condition is satisfied. In an aspect, if the condition is satisfied, a positive acknowledgement (ACK) is sent to the scheduling device to indicate that the scheduled resources identified in the DCI grant are decided to be utilized or a negative acknowledgement (NACK) is sent to the scheduling device to indicate that the scheduled resources identified in the DCI grant are decided to not be utilized. If the condition is not satisfied, no acknowledgement is sent to the scheduling device. The condition may relate to the DCI grant identifying a particular type of scheduled resources for communicating the data, the DCI grant identifying the scheduled resources for a particular type of data, and/or the DCI grant identifying the scheduled resources for communicating the data in a particular direction (e.g., uplink direction or downlink direction).

In an aspect, the received DCI grant is one of a plurality conflicting DCI grants received by the scheduled device. Accordingly, the scheduled device may determine whether any of the plurality of conflicting DCI grants requests the acknowledgement. In an aspect, if one DCI grant of the plurality of conflicting DCI grants is determined to not request the acknowledgement, the scheduled device selects the one DCI grant for communicating the data and sends a negative acknowledgement (NACK) to scheduling devices from which the DCI grants requesting the acknowledgement are received. In another aspect, if all DCI grants of the plurality of conflicting DCI grants are determined to request the acknowledgement, the scheduled device selects one of the conflicting DCI grants, sends the ACK to a scheduling device from which the selected DCI grant is received, and sends the NACK to scheduling devices from which non-selected DCI grants are received. In a further aspect, if more than one DCI grant of the plurality of conflicting DCI grants is determined to not request the acknowledgement, the scheduled device abandons all DCI grants of the plurality of conflicting DCI grants, or selects one DCI grant of the more than one DCI grant determined to not request the acknowledgement for communicating the data, and sends the NACK to scheduling devices from which the DCI grants requesting the acknowledgement are received.

At block 1608, the scheduled device communicates the data via the scheduled resources when the scheduled resources identified in the DCI grant are decided to be utilized.

In one configuration, the apparatus 1600 for wireless communication includes means for receiving a downlink control information (DCI) grant from a scheduling device, the DCI grant identifying scheduled resources for communicating data, means for deciding whether to utilize the scheduled resources identified in the DCI grant for communicating the data, means for sending an acknowledgement of the DCI grant to the scheduling device based on the decision and based on information associated with the DCI grant, and means for communicating the data via the scheduled resources when the scheduled resources identified in the DCI grant are decided to be utilized.

In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1-3, and utilizing, for example, the processes and/or algorithms described herein in relation to FIG. 16.

Figure 17:
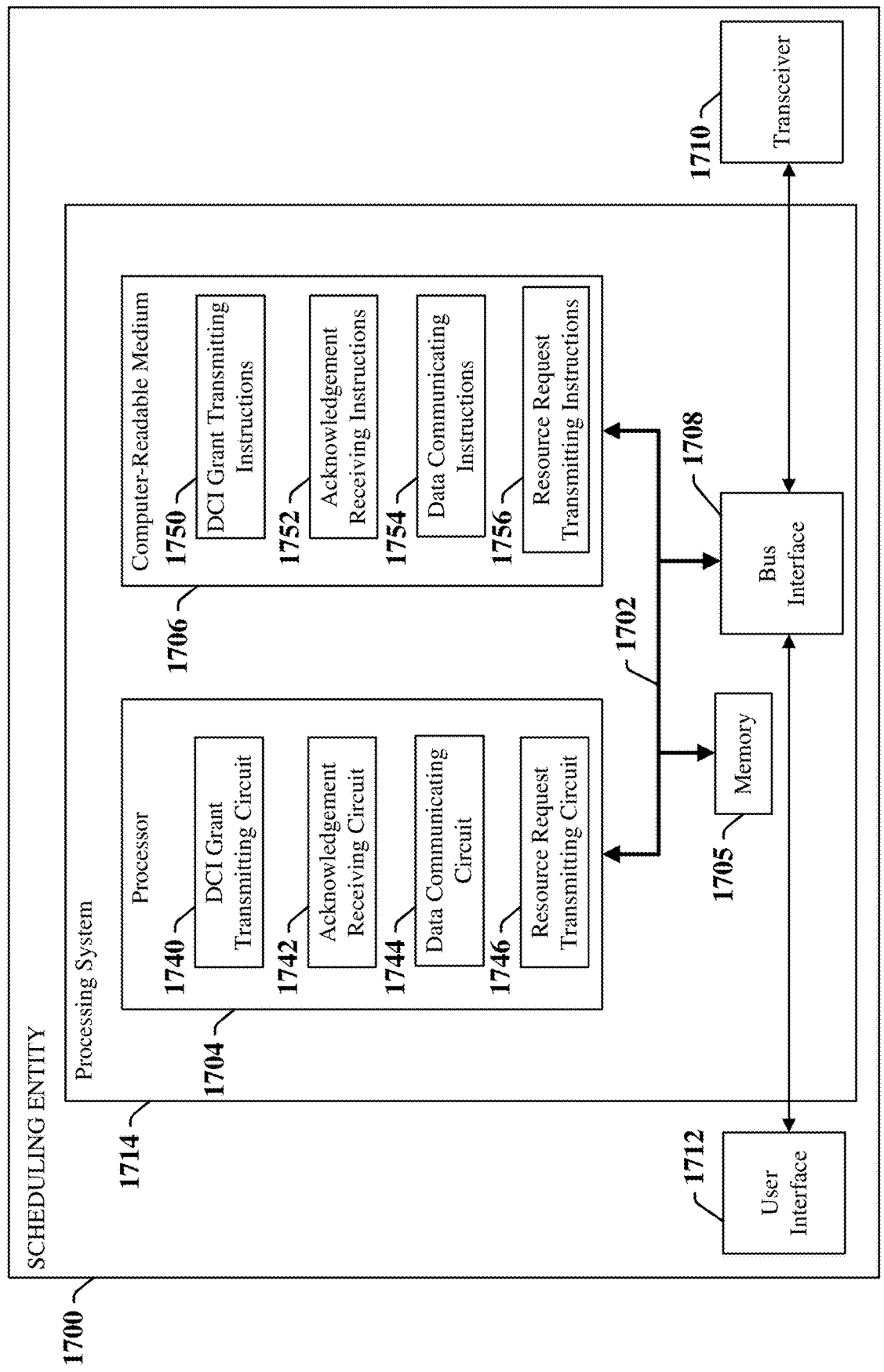
FIG. 17 is a block diagram conceptually illustrating an example of a hardware implementation for a scheduling entity according to some aspects of the disclosure.

FIG. 17 is a conceptual diagram illustrating an example of a hardware implementation for an exemplary scheduling entity 1700 employing a processing system 1714. In accordance with various aspects of the disclosure, an element, or any portion of an element, or any combination of elements may be implemented with a processing system 1714 that includes one or more processors 1704. For example, the scheduled entity 1700 may be a base station as illustrated in any one or more of FIGS. 1-3.

The processing system 1714 may be substantially the same as the processing system 1514 illustrated in FIG. 15, including a bus interface 1708, a bus 1702, memory 1705, a processor 1704, and a computer-readable medium 1706. Furthermore, the scheduling entity 1700 may include a user interface 1712 and a transceiver 1710 substantially similar to those described above in FIG. 15. That is, the processor 1704, as utilized in a scheduling entity 1700, may be used to implement any one or more of the processes described below and illustrated in FIG. 18.

In some aspects of the disclosure, the processor 1704 may include DCI grant receiving circuitry 1740 configured for various functions, including, for example, transmitting a downlink control information (DCI) grant to a scheduled device, the DCI grant identifying scheduled resources for communicating data. For example, the DCI grant transmitting circuitry 1740 may be configured to implement one or more of the functions described below in relation to FIG. 18, including, e.g., block 1802. The processor 1704 may also include acknowledgement receiving circuitry 1742 configured for various functions, including, for example, receiving an acknowledgement of the DCI grant from the scheduled device based on information associated with the DCI grant, the acknowledgement indicating whether the scheduled resources identified in the DCI grant are to be utilized for communicating the data. For example, the acknowledgement receiving circuitry 1742 may be configured to implement one or more of the functions described below in relation to FIG. 18, including, e.g., block 1804. The processor 1704 may also include data communicating circuitry 1744 configured for various functions, including, for example, communicating the data via the scheduled resources when the scheduled resources identified in the DCI grant are indicated to be utilized. For example, the data communicating circuitry 1744 may be configured to implement one or more of the functions described below in relation to FIG. 18, including, e.g., block 1806. The processor 1704 may further include resource request transmitting circuitry 1746 configured for various functions, including, for example, transmitting a resource request message to a parent relay node, the resource request message identifying the scheduled resources for communicating the data. Accordingly, the acknowledgement receiving circuitry 1742 may further be configured to receive a separate acknowledgement of the resource request message, the separate acknowledgement indicating whether the scheduled resources identified in the resource request message are to be utilized for communicating the data and the data communicating circuitry 1744 may further be configured to communicate the data via the scheduled resources when the scheduled resources identified in the resource request message are indicated to be utilized.

In one or more examples, the computer-readable storage medium 1706 may include DCI grant transmitting instructions 1750 configured for various functions, including, for example, transmitting a downlink control information (DCI) grant to a scheduled device, the DCI grant identifying scheduled resources for communicating data. For example, the DCI grant transmitting instructions 1750 may be configured to implement one or more of the functions described below in relation to FIG. 18, including, e.g., block 1802. The computer-readable storage medium 1706 may also include acknowledgement receiving instructions 1752 configured for various functions, including, for example, receiving an acknowledgement of the DCI grant from the scheduled device based on information associated with the DCI grant, the acknowledgement indicating whether the scheduled resources identified in the DCI grant are to be utilized for communicating the data. For example, the acknowledgement receiving instructions 1752 may be configured to implement one or more of the functions described below in relation to FIG. 18, including, e.g., block 1804. The computer-readable storage medium 1706 may also include data communicating instructions 1754 configured for various functions, including, for example, communicating the data via the scheduled resources when the scheduled resources identified in the DCI grant are indicated to be utilized. For example, the data communicating instructions 1754 may be configured to implement one or more of the functions described below in relation to FIG. 18, including, e.g., block 1806. The computer-readable storage medium 1706 may further include resource request transmitting instructions 1756 configured for various functions, including, for example, transmitting a resource request message to a parent relay node, the resource request message identifying the scheduled resources for communicating the data. Accordingly, the acknowledgement receiving instructions 1752 may further be configured to receive a separate acknowledgement of the resource request message, the separate acknowledgement indicating whether scheduled resources identified in the resource request message are to be utilized for communicating the data and the data communicating instructions 1754 may further be configured to communicate the data via the scheduled resources when the scheduled resources identified in the resource request message are indicated to be utilized.

Figure 18:
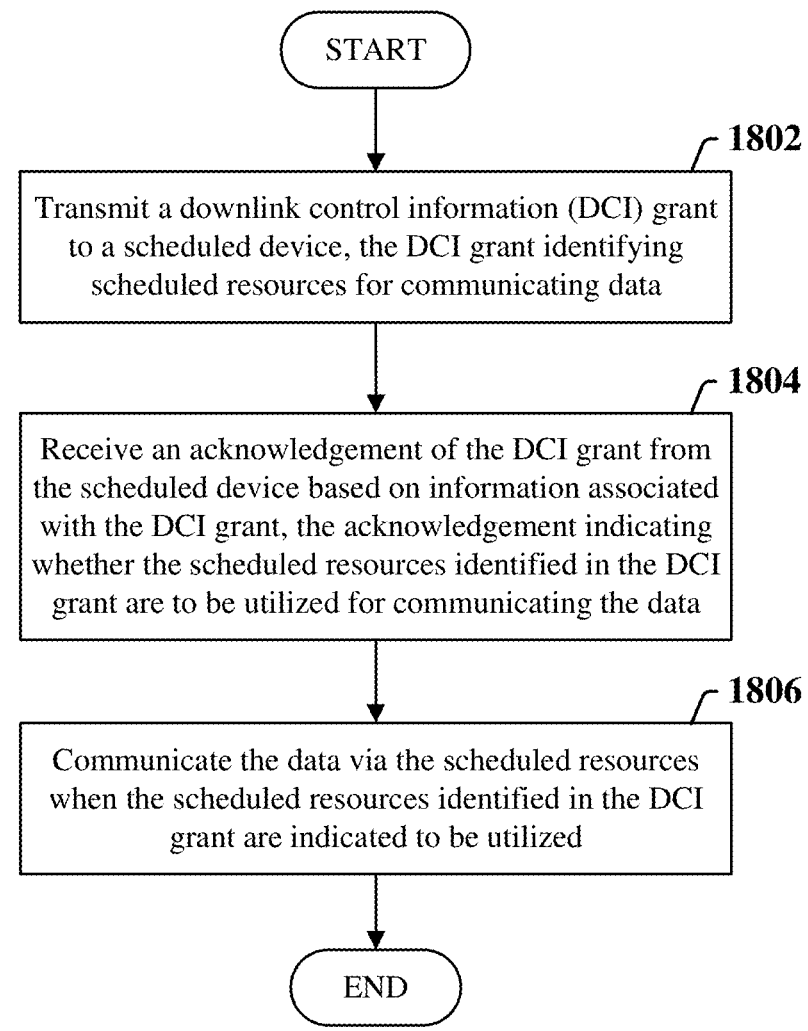
FIG. 18 is a flow chart illustrating an exemplary process for coordinating resource usage at a scheduling entity in accordance with some aspects of the present disclosure.

FIG. 18 is a flow chart illustrating an exemplary process 1800 for coordinating resource usage in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by a scheduling device (e.g., the scheduling entity 1700 illustrated in FIG. 17). In some examples, the process 1800 may be carried out by any suitable apparatus or means for carrying out the functions or algorithm described below.

At block 1802, the scheduling device transmits a downlink control information (DCI) grant to a scheduled device. The DCI grant identifies scheduled resources for communicating data. The scheduling device may decide whether to request acknowledgement of the DCI grant based on conditions such as a resource type, a data type, or a communication direction (e.g., uplink direction or downlink direction), etc. In an aspect, the scheduling device may be associated with a first type of resources and the scheduled device may be associated with a second type of resources. The scheduling device may decide to request the acknowledgement of the DCI grant if the scheduled resources are the second type of resources. The scheduling device may decide not to request the acknowledgement of the DCI grant if the scheduled resources are the first type of resources.

At block 1804, the scheduling device receives an acknowledgement of the DCI grant from the scheduled device based on information associated with the DCI grant. The acknowledgement may indicate whether the scheduled resources identified in the DCI grant are to be utilized for communicating the data.

In an aspect, the information associated with the DCI grant is a value of an acknowledgement request bit included in the DCI grant. As such, the scheduling device may set the value of the acknowledgement request bit included in the DCI grant and receive the acknowledgement from the scheduled device based on the value of the acknowledgement request bit. In an aspect, if the value of the acknowledgement request bit is 1, a positive acknowledgement (ACK) is received from the scheduled device to indicate that the scheduled resources identified in the DCI grant are to be utilized or a negative acknowledgement (NACK) is received from the scheduled device to indicate that the scheduled resources identified in the DCI grant are to not be utilized. In another aspect, if the value of the acknowledgement request bit is 0, no acknowledgement is received from the scheduled device. Moreover, if the NACK is received from the scheduled device, the scheduling device may further receive additional information from the scheduled device. The additional information may be configured to assist the scheduling device to transmit a subsequent DCI grant scheduling other resources for communicating the data. The additional information may include an identification of the other resources for communicating the data, or a transmission configuration (e.g., a modulation and coding scheme (MCS), a transmission (TX) power adjustment, a precoding selection, a back off time, a value, etc.).

In another aspect, the information associated with the DCI grant is a condition associated with the DCI grant. As such, the scheduling device may receive the acknowledgement from the scheduled device if the condition is satisfied. In an aspect, if the condition is satisfied, a positive acknowledgement (ACK) is received from the scheduled device indicating that the scheduled resources identified in the DCI grant are to be utilized or a negative acknowledgement (NACK) is received from the scheduled device indicating that the resources identified in the DCI grant are to not be utilized. In a further aspect, if the condition is not satisfied, no acknowledgement is received from the scheduled device. The condition may be related to the DCI grant identifying a particular type of scheduled resources for communicating the data, the DCI grant identifying the scheduled resources for a particular type of data, and/or the DCI grant identifying the scheduled resources for communicating the data in a particular direction (e.g., uplink direction or downlink direction).

At block 1804, the scheduling device communicates the data via the scheduled resources when the scheduled resources identified in the DCI grant are indicated to be utilized.

In an aspect, the scheduling device is a relay node and the scheduled device is a child relay node. Accordingly, the scheduling device may also transmit a resource request message to a parent relay node. The resource request message identifies the scheduled resources for communicating the data. Moreover, the scheduling device may also receive a separate acknowledgement of the resource request message, the separate acknowledgement indicating whether the scheduled resources identified in the resource request message are to be utilized for communicating the data, and communicate the data via the scheduled resources when the scheduled resources identified in the resource request message are indicated to be utilized.

In one configuration, the apparatus 1700 for coordinating resource usage includes means for transmitting a downlink control information (DCI) grant to a scheduled device, the DCI grant identifying scheduled resources for communicating data, means for receiving an acknowledgement of the DCI grant from the scheduled device based on information associated with the DCI grant, the acknowledgement indicating whether the scheduled resources identified in the DCI grant are to be utilized for communicating the data, means for transmitting a resource request message to a parent relay node, the resource request message identifying the scheduled resources for communicating the data, and means for communicating the data via the scheduled resources when the scheduled resources identified in the DCI grant/resource request message are indicated to be utilized.

In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1-3, and utilizing, for example, the processes and/or algorithms described herein in relation to FIG. 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method operable at a scheduled device for coordinating resource usage, the method comprising:
  receiving a downlink control information (DCI) grant from a scheduling device, the DCI grant identifying scheduled resources for communicating data;

deciding whether to utilize the scheduled resources identified in the DCI grant for communicating the data;

sending an acknowledgement of the DCI grant to the scheduling device based, at least in part, on the decision and information associated with the DCI grant, wherein the information associated with the DCI grant comprises an acknowledgement request indication in the DCI grant, a condition associated with the DCI grant, or both; and communicating the data via the scheduled resources when the scheduled resources identified in the DCI grant are decided to be utilized.

2. The method of claim 1, wherein the acknowledgement request indication in the DCI grant comprises a value of an acknowledgement request bit included in the DCI grant.

3. The method of claim 2, the method further comprises sending additional information to the scheduling device, wherein the additional information is configured to assist the scheduling device to transmit a subsequent DCI grant.

4. The method of claim 3, wherein the additional information includes at least one of:
an identification of the other resources for communicating the data; or
a transmission configuration.

5. The method of claim 1, wherein the acknowledgement includes:
a positive acknowledgement (ACK) if the scheduled resources identified in the DCI grant are decided to be utilized, and
a negative acknowledgement (NACK) if the scheduled resources identified in the DCI grant are decided to not be utilized.

6. The method of claim 1, wherein the condition comprises at least one of:
the DCI grant identifying a particular type of scheduled resources for communicating the data;
the DCI grant identifying the scheduled resources for a particular type of data; or
the DCI grant identifying the scheduled resources for communicating the data in a particular direction.

7. The method of claim 1, wherein the scheduled resources identified in the DCI grant are decided to be utilized based, at least in part, on at least one of:
a random decision;
a priority of the scheduling device with respect to at least one other scheduling device from which another DCI grant is received, wherein the priority of the scheduling device is derived based on buffer status information at the scheduled device;
a priority parameter included in the DCI grant; or
a priority associated with the scheduled resources identified in the DCI grant.

8. A scheduled device for coordinating resource usage, comprising:
means for receiving a downlink control information (DCI) grant from a scheduling device, the DCI grant identifying scheduled resources for communicating data;
means for deciding whether to utilize the scheduled resources identified in the DCI grant for communicating the data;
means for sending an acknowledgement of the DCI grant to the scheduling device based, at least in part, on the decision and information associated with the DCI grant, wherein the information associated with the DCI grant comprises an acknowledgement request indication in the DCI grant, a condition associated with the DCI grant, or both; and
means for communicating the data via the scheduled resources when the scheduled resources identified in the DCI grant are decided to be utilized.

9. The scheduled device of claim 8, wherein the acknowledgement request indication in the DCI grant comprises a value of an acknowledgement request bit included in the DCI grant.

10. The scheduled device of claim 9, wherein the means for sending the acknowledgement is further configured to send additional information to the scheduling device, wherein the additional information is configured to assist the scheduling device to transmit a subsequent DCI grant.

11. The scheduled device of claim 10, wherein the additional information includes at least one of:
an identification of the other resources for communicating the data; or
a transmission configuration.

12. The scheduled device of claim 8, wherein the acknowledgement includes:
a positive acknowledgement (ACK) to the scheduling device to indicate that the scheduled resources identified in the DCI grant are decided to be utilized, and
a negative acknowledgement (NACK) to the scheduling device to indicate that the scheduled resources identified in the DCI grant are decided to not be utilized.

13. The scheduled device of claim 8, wherein the condition comprises at least one of:
the DCI grant identifying a particular type of scheduled resources for communicating the data;
the DCI grant identifying the scheduled resources for a particular type of data; or
the DCI grant identifying the scheduled resources for communicating the data in a particular direction.

14. The scheduled device of claim 8, wherein the scheduled resources identified in the DCI grant are decided to be utilized based, at least in part, on at least one of:
a random decision;
a priority of the scheduling device with respect to at least one other scheduling device from which another DCI grant is received, wherein the priority of the scheduling device is derived based on buffer status information at the scheduled device;
a priority parameter included in the DCI grant; or
a priority associated with the scheduled resources identified in the DCI grant.

15. A method operable at a scheduling device for coordinating resource usage, the method comprising:
transmitting a downlink control information (DCI) grant to a scheduled device, the DCI grant identifying scheduled resources for communicating data;
receiving an acknowledgement of the DCI grant from the scheduled device based on information associated with the DCI grant, the acknowledgement indicating whether the scheduled resources identified in the DCI grant are to be utilized for communicating the data, wherein the information associated with the DCI grant comprises an acknowledgement request indication in the DCI grant, a condition associated with the DCI grant, or both; and
communicating the data via the scheduled resources when the scheduled resources identified in the DCI grant are indicated to be utilized.

16. The method of claim 15, wherein the acknowledgement request included in the DCI grant comprises a value of an acknowledgement request bit included in the DCI grant.

17. The method of claim 15, the method further comprises:

receiving additional information from the scheduled device,
   wherein the additional information is configured to assist the scheduling device to transmit a subsequent DCI grant scheduling other resources, and
   wherein the additional information includes at least one of:
      an identification of the other resources, or
      a transmission configuration.

18. The method of claim 15, wherein the condition comprises at least one of:
   the DCI grant identifying a particular type of scheduled resources for communicating the data;
   the DCI grant identifying the scheduled resources for a particular type of data; or
   the DCI grant identifying the scheduled resources for communicating the data in a particular direction.

19. The method of claim 15, wherein the transmitting the DCI grant includes deciding whether to request the acknowledgement of the DCI grant based, at least in part, on a resource type, a data type, a communication direction, or some combination thereof.

20. The method of claim 15, wherein the scheduling device comprises a relay node and the scheduled device comprises a child relay node.

21. A scheduling device for coordinating resource usage, comprising:
   means for transmitting a downlink control information (DCI) grant to a scheduled device, the DCI grant identifying scheduled resources for communicating data;
   means for receiving an acknowledgement of the DCI grant from the scheduled device based on information associated with the DCI grant, the acknowledgement indicating whether the scheduled resources identified in the DCI grant are to be utilized for communicating the data, wherein the information associated with the DCI grant comprises an acknowledgement request indication in the DCI grant, a condition associated with the DCI grant, or both; and
   means for communicating the data via the scheduled resources when the scheduled resources identified in the DCI grant are indicated to be utilized.

22. The scheduling device of claim 21, wherein the acknowledgement request included in the DCI grant comprises a value of an acknowledgement request bit included in the DCI grant.

23. The scheduling device of claim 21, and further comprising:
   means for receiving additional information from the scheduled device,
   wherein the additional information is configured to assist the scheduling device to transmit a subsequent DCI grant scheduling other resources, and
   wherein the additional information includes at least one of:
      an identification of the other resources, or
      a transmission configuration.

24. The scheduling device of claim 21, wherein the condition comprises at least one of:
   the DCI grant identifying a particular type of scheduled resources for communicating the data;
   the DCI grant identifying the scheduled resources for a particular type of data; or
   the DCI grant identifying the scheduled resources for communicating the data in a particular direction.

25. The scheduling device of claim 21,
   wherein the means for transmitting the DCI grant is configured to decide whether to request the acknowledgement of the DCI grant based, at least in part, on a resource type, a data type, a communication direction, or some combination thereof.

26. The scheduling device of claim 21, wherein the scheduling device is a relay node and the scheduled device is a child relay node.

* * * * *